(12) United States Patent
Gutlansky et al.

(10) Patent No.: US 12,472,987 B1
(45) Date of Patent: Nov. 18, 2025

(54) PICK-UP AND DROP-OFF SIGNALS FOR MANAGING DOUBLE PARKING OBSTRUCTION

(71) Applicant: Waymo LLC, Mountain View, CA (US)

(72) Inventors: Daniella Gutlansky, San Francisco, CA (US); Mishika Vora, Hayward, CA (US); Xu Dong, Mountain View, CA (US); Trang Uyen Thien Tran, Arlington, TX (US); Yu Zheng, Milpitas, CA (US); Amir Takhmar, Toronto (CA)

(73) Assignee: Waymo LLC, Mountain View, CA (US)

( * ) Notice: Subject to any disclaimer, the term of this patent is extended or adjusted under 35 U.S.C. 154(b) by 256 days.

(21) Appl. No.: 18/075,620

(22) Filed: Dec. 6, 2022

Related U.S. Application Data

(60) Provisional application No. 63/294,422, filed on Dec. 29, 2021.

(51) Int. Cl.
*B60W 60/00* (2020.01)
*B60W 30/06* (2006.01)

(52) U.S. Cl.
CPC ...... *B60W 60/00253* (2020.02); *B60W 30/06* (2013.01)

(58) Field of Classification Search
CPC .................. B60W 60/00253; B60W 30/06
See application file for complete search history.

(56) References Cited

U.S. PATENT DOCUMENTS 9,599,477 B1  3/2017 Aula et al.
9,766,626 B1  9/2017 Zhu et al.
(Continued)

FOREIGN PATENT DOCUMENTS

WO    2016183525 A1    11/2016

OTHER PUBLICATIONS

"Meaning of double-park in English", 2025, Cambridge Advanced Learner's Dictionary & Thesaurus, Cambridge University Press; https://dictionary.cambridge.org/US/dictionary/english/double-park (Year: 2025).*

(Continued)

*Primary Examiner* — Wade Miles
*Assistant Examiner* — Aaron G Cain
(74) *Attorney, Agent, or Firm* — Botos Churchill IP Law

(57) ABSTRACT

The technology involves pick-up and drop-off techniques for autonomous vehicles. Pullover selection options are evaluated by considering road user inconvenience and dynamic changes to such inconvenience. In response, a change in vehicle operation is made as needed. This process may consider whether a given situation is "likely-inconvenient" or "unlikely-inconvenient" based on both statie and dynamic signals from the environment for a likely pick-up or drop-off location. The vehicle may request remote support to determine whether to pull over or to move from a stopped location, for instance based on changes to dynamic signals associated with other road users. In double parking situations, the vehicle may determine whether to remain double parked or move to limit inconvenience to a minimum number of other vehicles, such as by blocking as few other vehicles as possible or by making it as easy as possible for a parked vehicle to pull out.

20 Claims, 28 Drawing Sheets

(56) References Cited

U.S. PATENT DOCUMENTS

| | | | |
|---|---|---|---|
| 9,953,283 | B2 | 4/2018 | Sweeney et al. |
| 10,261,512 | B1 | 4/2019 | Cullinane et al. |
| 10,955,848 | B2 | 3/2021 | Dyer et al. |
| 11,898,864 | B1 | 2/2024 | Konala et al. |
| 2008/0136674 | A1 | 6/2008 | Jang et al. |
| 2016/0019790 | A1 | 1/2016 | Tobolski et al. |
| 2016/0240084 | A1 | 8/2016 | Takeuchi |
| 2016/0370194 | A1 | 12/2016 | Colijn et al. |
| 2017/0140586 | A1* | 5/2017 | Volz ............... G06Q 30/0645 |
| 2017/0329346 | A1* | 11/2017 | Latotzki ............. G08G 1/202 |
| 2017/0361835 | A1 | 12/2017 | Tarte et al. |
| 2018/0113455 | A1* | 4/2018 | Lagnemma ........ B62D 15/0285 |
| 2018/0156625 | A1 | 6/2018 | Mangal et al. |
| 2019/0137290 | A1 | 5/2019 | Levy et al. |
| 2019/0235521 | A1 | 8/2019 | Mudalige et al. |
| 2019/0286126 | A1 | 9/2019 | Williams et al. |
| 2020/0097007 | A1 | 3/2020 | Dyer et al. |
| 2020/0401147 | A1 | 12/2020 | Lim et al. |
| 2021/0101625 | A1 | 4/2021 | Shrestha et al. |
| 2021/0309214 | A1 | 10/2021 | Hashimoto et al. |
| 2022/0221867 | A1* | 7/2022 | Taveira ............... G05D 1/617 |
| 2022/0297725 | A1* | 9/2022 | Zwiener .......... B60W 30/18163 |

OTHER PUBLICATIONS

Estepa, Rafael, et al., "More Effective Use of Urban Space by Autonomous Double Parking", Wiley, Hindawi, Journal of Advanced Transportation, vol. 2017, Article ID8426946, pp. 1-10.
Gu, Tianyu, et al., "Toward human-like motion planning in urban environments", Conference Paper, Jun. 2014, https://www.researchgate.net/publication/269294131, pp. 1-7.
Li, Yang, et al., "Manually Driven Vehicle Encounters with Autonomous Vehicle in Bottleneck Roads: HMI Design for Communication Issues", ResearchGate, HAI 2021, Virtual Event, Japan, pp. 1-5.
Millard-Ball, Adam, "The autonomous vehicle parking problem", Preprint of manuscript published in Transport Policy, University of California, http://dx.doi.org/10.1016/j.tranpol.2019.01.003, Jan. 2019.
Morillo, Carlos, et al., "On-street illegal parking costs in urban areas", Procedia Social and Behavioral Sciences 160, Elsevier, ScienceDirect, 2014, pp. 342-351.
Paromtchik, Igor, et al., "Motion Generation and Control for Parking an Autonomous Vehicle", IEEE, 1996, pp. 1-6.
Razif, Muhammad Rusydi Muhammad, et al., "Autonomous Vehicle Repositioning System for Double-Parking", International Journal of Advanced Trends in Computer Science and Engineering, vol. 9, No. 1.4, 2020, ISSN 2278-3091, pp. 523-529.

\* cited by examiner

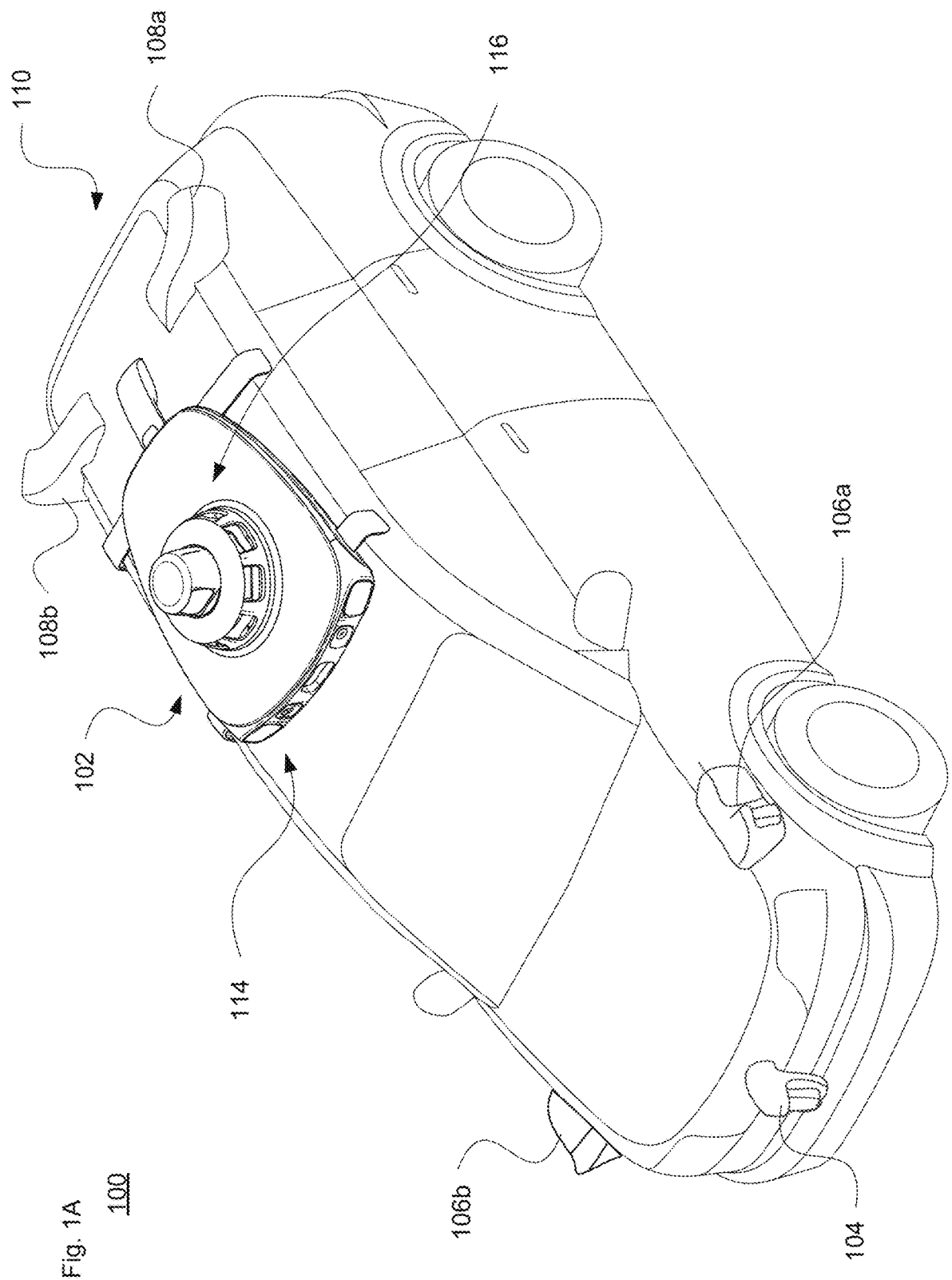

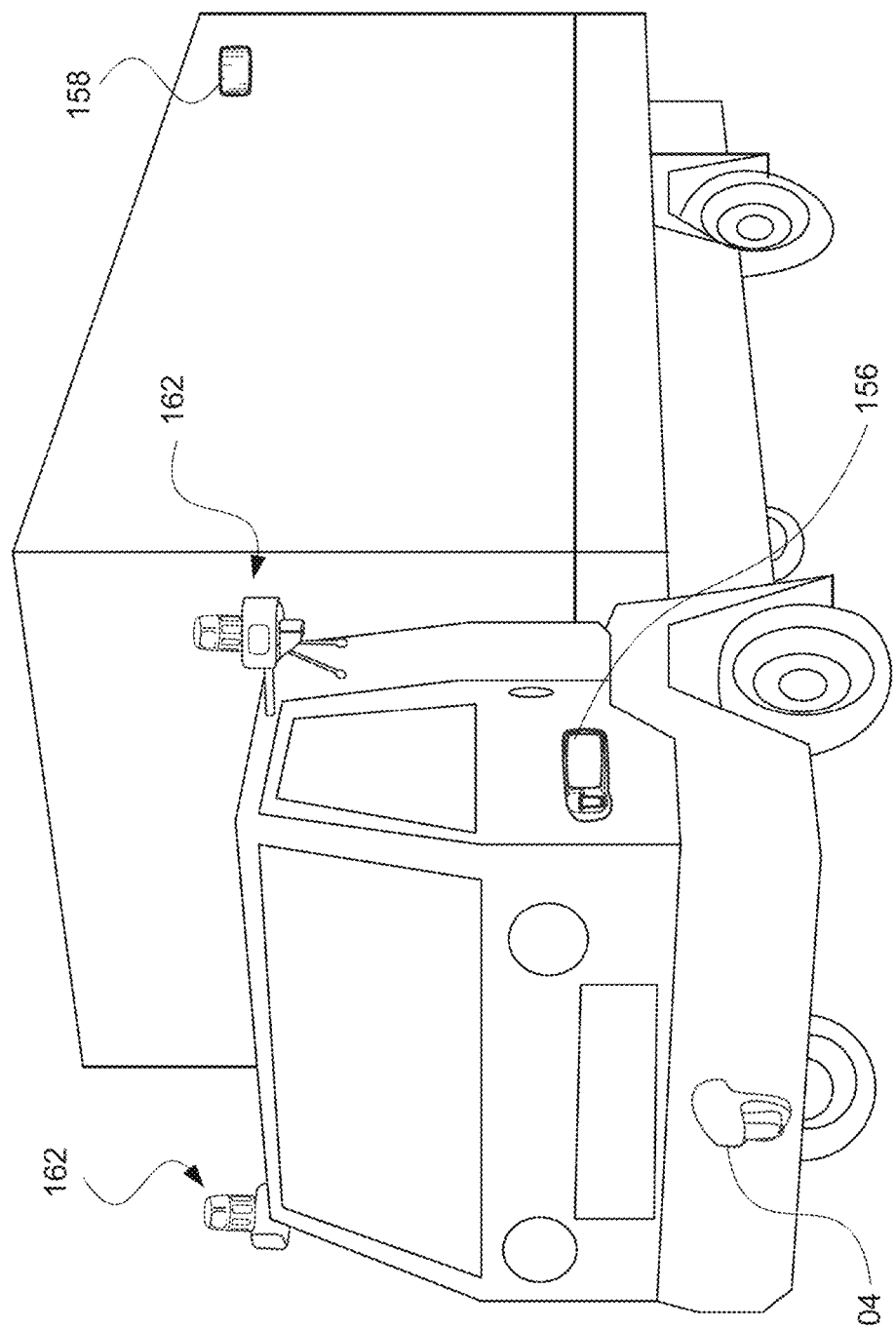

400

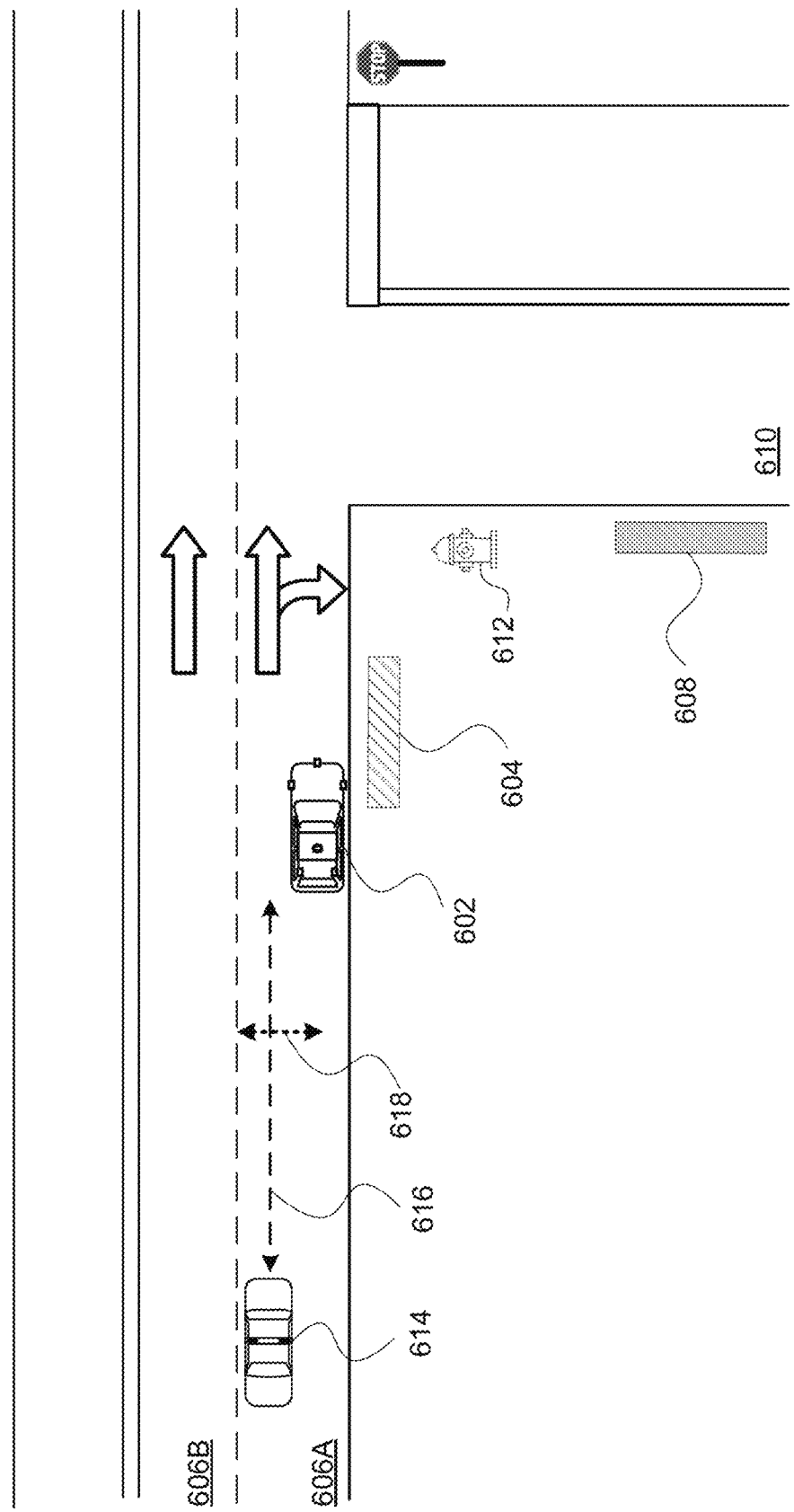

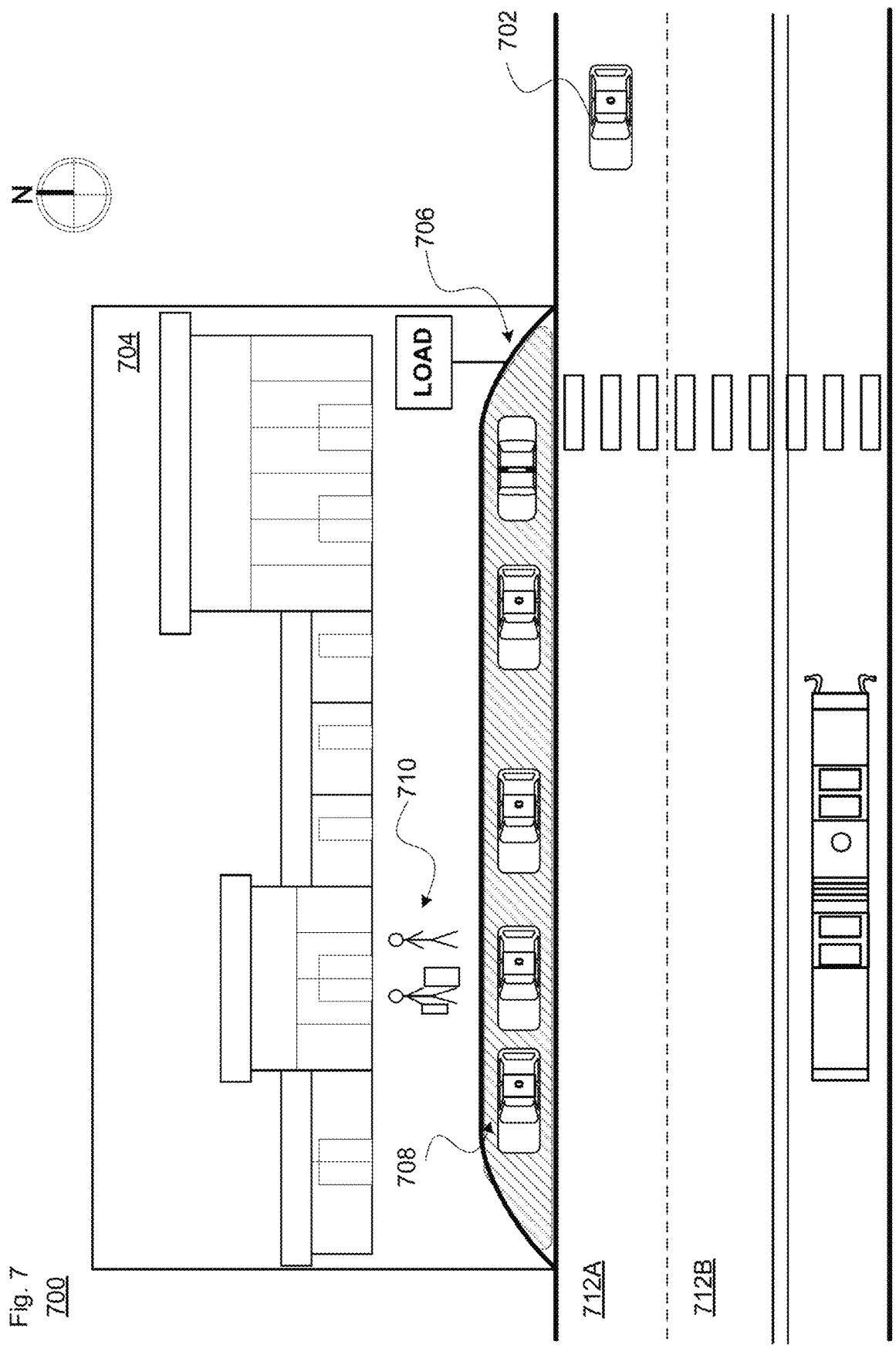

800

850

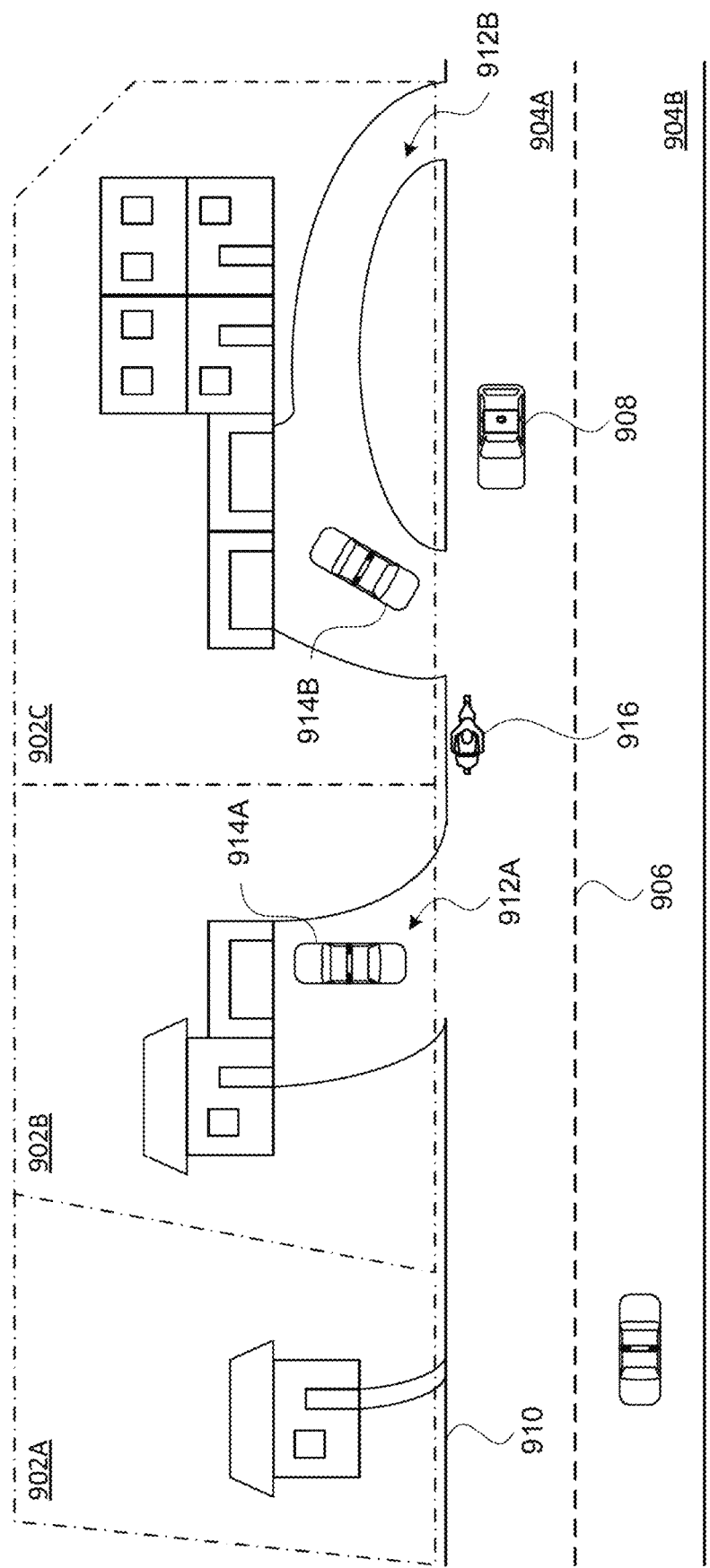

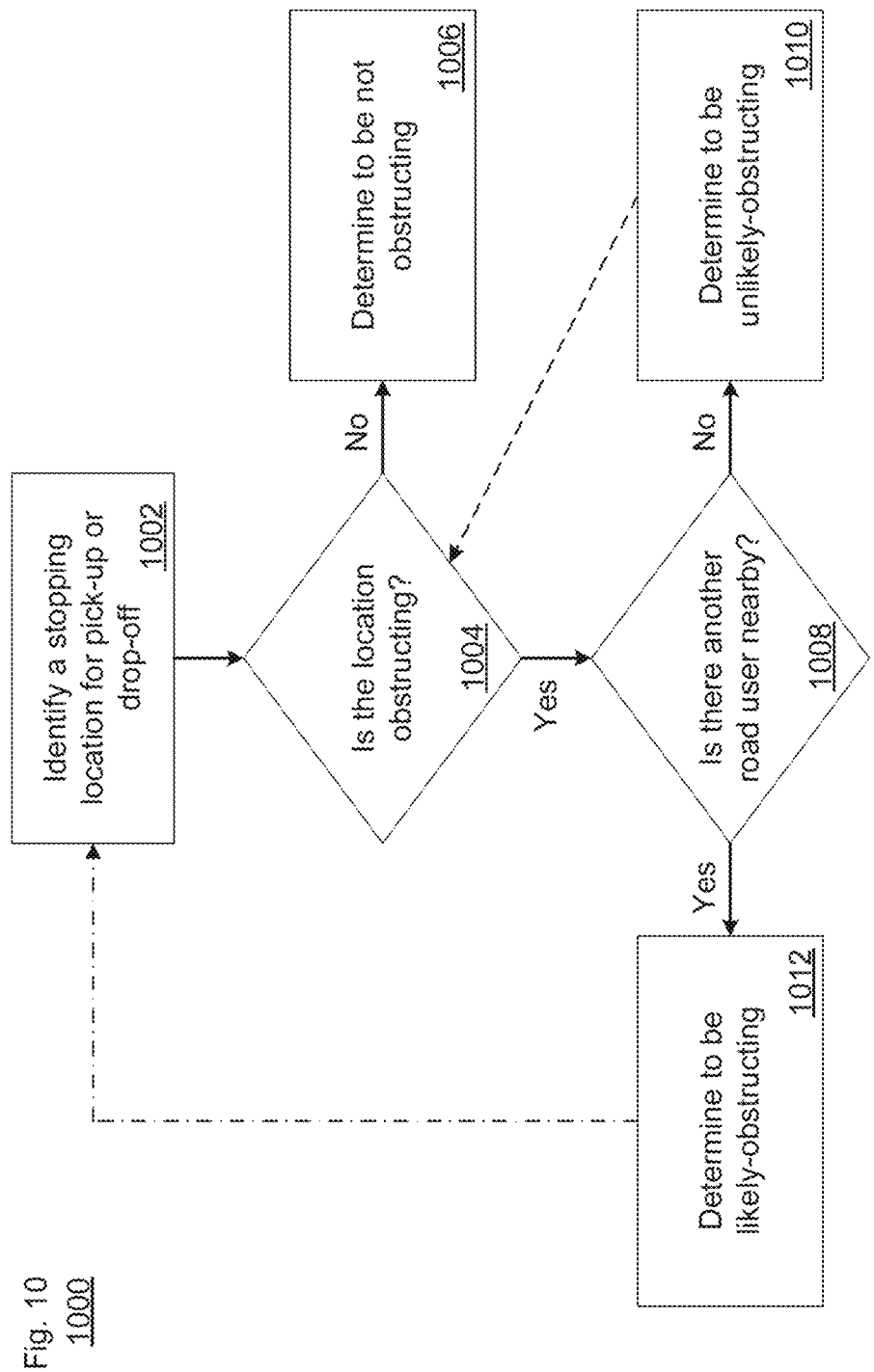

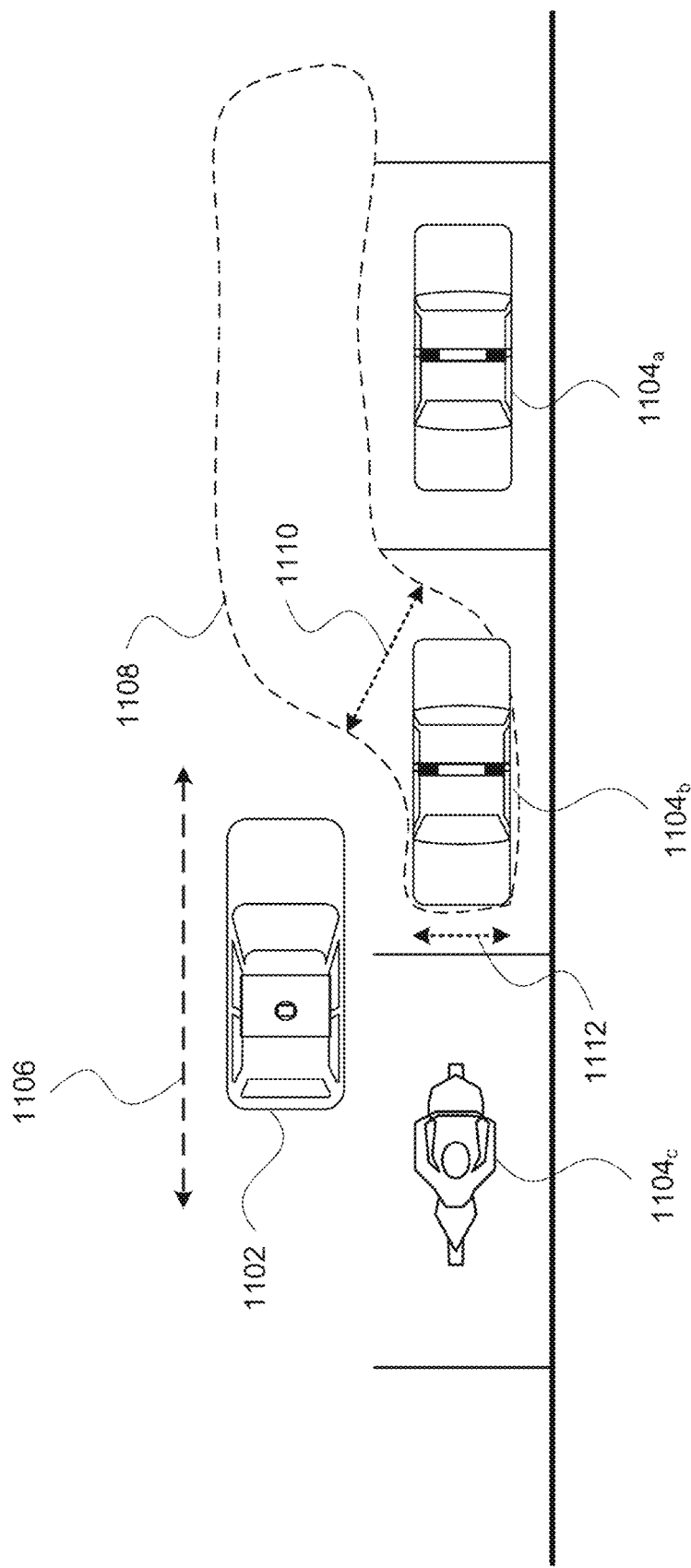

1200

1300

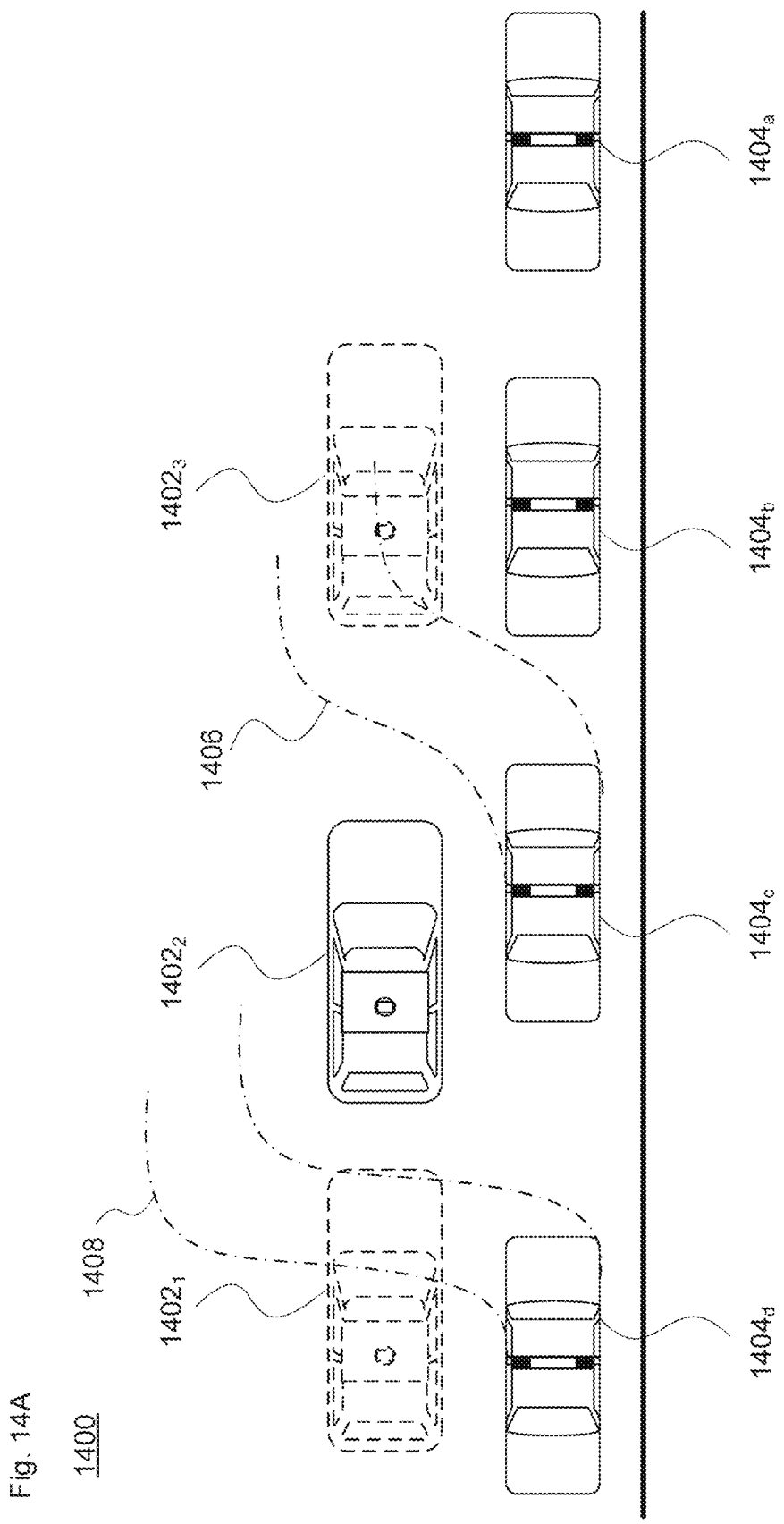

1450

1600

PICK-UP AND DROP-OFF SIGNALS FOR MANAGING DOUBLE PARKING OBSTRUCTION

CROSS-REFERENCE TO RELATED APPLICATIONS

This application claims the benefit of the filing date of U.S. Provisional Application No. 63/294,422, filed Dec. 29, 2021, the entire disclosure of which is incorporated by reference herein. This application is related to co-pending application Ser. No. 18/075,592 filed Dec. 6, 2022, entitled "Pick-up and Drop-off Signals for Managing Obstruction of Other Road Users", the entire disclosure of which is incorporated by reference herein.

BACKGROUND

Autonomous vehicles, for instance, vehicles that may not require a human driver in certain driving situations, can be used to aid in the transport of passengers or items from one location to another. Vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings. This information is important for the vehicle's computing systems to make appropriate driving decisions for the vehicle. However, it may be challenging to determine exactly where to pull over or how long to wait during a pick-up or drop-off at a given location. Such driving-related decisions can impact other road users, including vehicles approaching from behind, or vehicles that are parked and may be blocked in during the pick-up or drop-off.

BRIEF SUMMARY

The technology relates to enhanced pick-up and drop-off techniques for autonomous vehicles. Aspects involve determining the "inconvenience" to other road users, evaluating pullover selection options by factoring in the inconvenience, monitoring dynamic changes of the degree of inconvenience, and causing a change in autonomous vehicle operation as needed in response to such changes. This process may include considering whether a given autonomous driving situation (scenario) is "likely-inconvenient" or "unlikely-inconvenient", which may include analyzing both static and dynamic signals from the environment for a likely pick-up or drop-off location. In some instances, the vehicle may request support from remote assistance to determine whether to pull over, or whether to move from a stopped location, for instance based on changes to dynamic signals associated with other road users. Other aspects of the technology focus on double parking situations, particularly how a double-parked autonomous vehicle may inconvenience nearby parked vehicles. Here, one goal is to limit inconvenience to a minimum number of other vehicles, such as by blocking as few other vehicles as possible or by making it as easy as possible for a parked vehicle to pull out.

According to one aspect, a method for operating a vehicle in an autonomous driving mode is provided. The method comprises identifying, by one or more processors of the vehicle, a route for the vehicle to a stopping location for a pick-up or a drop-off; determining, by the one or more processors based on evaluating a set of static signals, whether the stopping location is likely to be obstructing to one or more road users; determining, by the one or more processors based on evaluating at least a set of dynamic signals, whether at least one road user would be inconvenienced by the vehicle at the stopping location; upon determining that the stopping location is likely to be obstructing and that the at least one road user would be inconvenienced, the one or more processors determining that the vehicle is likely-obstructing and changing a stopping decision associated with the stopping location; and upon determining that the stopping location is likely to be obstructing and that the at least one road user would not be inconvenienced, the one or more processors determining that the vehicle is unlikely-obstructing and not changing the stopping decision associated with the stopping location.

In one scenario, the set of dynamic signals includes at least one of a type of action to be performed by the vehicle, a length of time the vehicle would be at the stopping location, or lane information associated with the stopping location. Alternatively or additionally, the set of dynamic signals may include at least one of a gap for road users to go around the vehicle, current traffic flow around the stopping location, predicted traffic flow around the stopping location when the vehicle would be stopped, or blockage information for vehicles parked at the stopping location. Alternatively or additionally, determining that the at least one road user would be inconvenienced may include evaluating a wait time by the vehicle at the stopping location. Here, the method may further comprise adjusting the wait time based on changes associated with the set of dynamic signals.

Alternatively or additionally, the method may further comprise selecting the stopping location based on a type of the pick-up or the drop-off to be performed. Here, selecting the stopping location may further include evaluating at least one of a type of the stopping location, a temporal restriction for the stopping location, or an environmental condition restriction for the stopping location.

Alternatively or additionally, the stopping location may be along a portion of a bicycle lane and the determining whether at least one road user would be inconvenienced includes determining whether any bicyclists would be in the bicycle lane adjacent to the stopping location for a determined amount of time. Alternatively or additionally, the stopping location may be a lane of a roadway and the determining whether at least one road user would be inconvenienced includes evaluating how long the vehicle is expected to be stopped with respect to a likelihood of the at least one road user approaching the stopping location while the vehicle is stopped. In this case evaluating how long the vehicle is expected to be stopped may further include evaluating a lateral gap between the vehicle and a given road user that is approaching the stopped location.

Alternatively or additionally, the stopping location may be at a loading zone and the determining whether at least one road user would be inconvenienced includes performing an evaluation of curb occupancy at the loading zone. Alternatively or additionally, changing the stopping decision may comprise controlling a driving system of the vehicle to either: position the vehicle clear from oncoming traffic, position the vehicle clear from at least one object along a driveway, or reduce a likelihood of blocking in another vehicle.

Alternatively or additionally, changing the stopping decision may comprise controlling a driving system of the vehicle to cause the vehicle to either drive past the stopping location to a different pullover spot, or to pull closer to a curb area at the stopping location. Alternatively or additionally, determining whether the at least one road user would be inconvenienced may include evaluating a lateral gap associated with the vehicle in accordance with a type of the at least one road user. Alternatively or additionally, upon determining that the vehicle is unlikely-obstructing, the method may further include continuing to monitor the set of dynamic signals. Alternatively or additionally, upon determining that the stopping location is likely to be obstructing and that the at least one road user would be inconvenienced, the changing a stopping decision associated with the stopping location may include adjusting a wait time of the vehicle at the stopping location and issuing a notification to a customer of the vehicle about the adjusted wait time.

Alternatively or additionally, determining whether the at least one road user would be inconvenienced by the vehicle at the stopping location may include employing a proxy to measure a degree of inconvenience to the at least one road user. Here, the proxy may correspond to a behavior planning progress cost in spacetime for each road user. Alternatively or additionally, the method may further comprise filtering out any road users determined to not be impacted by stoppage of the vehicle. Alternatively or additionally, the method may further comprise validating the set of dynamic signals against a curated test set of signals.

According to another aspect, a vehicle is configured to operate in an autonomous driving mode, in which the vehicle comprises: a perception system including one or more sensors, the one or more sensors being configured to receive sensor data associated with objects in an external environment of the vehicle; a driving system including a steering subsystem, an acceleration subsystem and a deceleration subsystem to control driving of the vehicle; a positioning system configured to determine a current position of the vehicle; and a control system including one or more processors. The control system is operatively coupled to the driving system, the perception system and the positioning system. The control system is configured to: identify a route for the vehicle to a stopping location for a pick-up or a drop-off; determine, based on evaluating a set of static signals, whether the stopping location is likely to be obstructing to one or more road users; determine, based on evaluating at least a set of dynamic signals, whether at least one road user would be inconvenienced by the vehicle at the stopping location; upon a determination that the stopping location is likely to be obstructing and that the at least one road user would be inconvenienced, determine that the vehicle is likely-obstructing and changing a stopping decision associated with the stopping location; and upon a determination that the stopping location is likely to be obstructing and that the at least one road user would not be inconvenienced, determine that the vehicle is unlikely-obstructing and not changing the stopping decision associated with the stopping location.

According to another aspect, a method for operating a vehicle in an autonomous driving mode is provided. The method comprises identifying, by one or more processors of the vehicle, a route for the vehicle to a stopping location for a pick-up or a drop-off; upon arrival at the stopping location, determining by the one or more processors to double park adjacent to one or more parked vehicles; evaluating, by the one or more processors based on sensor information identifying positioning of each of the one or more parked vehicles, an inconvenience to each of the one or more parked vehicles according to a cost function; selecting, by the one or more processors based on the evaluated inconvenience to each of the one or more parked vehicles, a specific position to double park the vehicle at the stopping location; and controlling a driving system of the vehicle to park at the specific position.

Here, evaluating the inconvenience based on the sensor information identifying positioning of each of the one or more parked vehicles may include determining an orientation of each parked vehicle. In this case, evaluating the inconvenience may further include determining a minimum number of vehicles to block by double parking.

Alternatively or additionally, evaluating the inconvenience to each of the one or more parked vehicles may include evaluating an ability of each parked vehicle to pull out. Evaluating the ability of each parked vehicle to pull out may include evaluating whether a given parked vehicle would be able to perform a double lane change maneuver. Alternatively or additionally, evaluating the ability of each parked vehicle to pull out may include evaluating a safe gap between two adjacent parked vehicles. Alternatively or additionally, evaluating the ability of each parked vehicle to pull out may include performing a trajectory evaluation for a given parked vehicle.

Alternatively or additionally, evaluating the inconvenience to each of the one or more parked vehicles may include evaluating a percentage of parked vehicles that would be blocked by the vehicle. Alternatively or additionally, the cost function may be based on a number of parked vehicles to be blocked by vehicle over a total number of parked vehicles within a selected consideration range. Alternatively or additionally, the cost function may be determined according to the following equation:

$$\text{Cost} = \text{weight} * \sum_{i=1}^{n} \text{sign}(-d_i)/n$$

wherein the weight is a predetermined constant, n is a total number of parked vehicles, and di is a distance from a front right corner of the vehicle to an $i^{th}$ parked vehicle that may try to pull out.

Alternatively or additionally, selecting the specific position to double park the vehicle at the stopping location may be done so that the specific position is between pullout paths of a pair of adjacent parked vehicles. Alternatively or additionally, selecting the specific position to double park the vehicle at the stopping location may include evaluating a minimum pulling out region required for each parked vehicle.

According to a further aspect, a vehicle is configured to operate in an autonomous driving mode, in which the vehicle comprises: a perception system including one or more sensors, the one or more sensors being configured to receive sensor data associated with objects in an external environment of the vehicle; a driving system including a steering subsystem, an acceleration subsystem and a deceleration subsystem to control driving of the vehicle; a positioning system configured to determine a current position of the vehicle; and a control system including one or more processors. The control system is operatively coupled to the driving system, the perception system and the positioning system, the control system is configured to: identify a route for the vehicle to a stopping location for a pick-up or a drop-off; upon arrival at the stopping location, determine to double park adjacent to one or more parked vehicles; evaluate, based on sensor information identifying positioning of each of the one of more parked vehicles, an inconvenience to each of the one or more parked vehicles according to a cost function; select, based on the evaluated inconvenience to each of the one or more parked vehicles, a specific position to double park the vehicle at the stopping location; and control the driving system of the vehicle to park at the specific position.

Here, evaluation of the inconvenience based on the sensor information identifying positioning of each of the one or more parked vehicles may include a determination of an orientation of each parked vehicle. Alternatively or additionally, evaluation of the inconvenience to each of the one or more parked vehicles may include an evaluation of an ability of each parked vehicle to pull out. Alternatively or additionally, evaluation of the ability of each parked vehicle to pull out may include an evaluation of whether a given parked vehicle would be able to perform a double lane change maneuver.

Alternatively or additionally, evaluation of the ability of each parked vehicle to pull out may include an evaluation of a safe gap between two adjacent parked vehicles. Alternatively or additionally, evaluation of the ability of each parked vehicle to pull out may include performance of a trajectory evaluation for a given parked vehicle.

Alternatively or additionally, evaluation of the inconvenience to each of the one or more parked vehicles may include an evaluation of a percentage of parked vehicles that would be blocked by the vehicle. Alternatively or additionally, the cost function may be based on a number of parked vehicles to be blocked by vehicle over a total number of parked vehicles within a selected consideration range. Alternatively or additionally, selection of the specific position to double park the vehicle at the stopping location may be either: done so that the specific position is between pullout paths of a pair of adjacent parked vehicles; or includes evaluating a minimum pulling out region required for each parked vehicle.

BRIEF DESCRIPTION OF THE DRAWINGS

FIGS. 1A-B illustrate example self-driving vehicles in accordance with aspects of the technology.

FIGS. 1C-E illustrate example cargo and delivery type vehicles configured for use with aspects of the technology.

FIG. 6 illustrate an extended stop in lane situation in accordance with aspects of the technology.

FIG. 7 illustrate a loading zone situation in accordance with aspects of the technology.

FIG. 9 illustrate a driveway blocking situation in accordance with aspects of the technology.

FIG. 10 illustrates an example of an inconvenience determination process in accordance with aspects of the technology.

FIG. 11 illustrates a parallel parking situation in accordance with aspects of the technology.

FIGS. 14A-B illustrate double-parking considerations in accordance with aspects of the technology.

DETAILED DESCRIPTION

Performing pick-ups and drop-offs in complex environments, such as dense urban areas with a lot of traffic, along roadways that are narrow or have only one or two lanes, or during rush hour, can be a challenge for autonomous vehicles. Such vehicles may continually evaluate their surrounding environment via sensor data obtained by an onboard perception system. In addition, autonomous vehicles consider safety, applicable traffic laws, and other constraints when selecting where the vehicle should pull over to let off or pick up riders, or to deliver meals, groceries, packages or other cargo. Thus, there is a tradeoff between the vehicle waiting at a selected location to perform a pick-up or drop-off and potential inconvenience to other road users who will pass by or otherwise be near the selected location while the vehicle is waiting.

In such situations, an autonomous vehicle should be able to evaluate the impact ("inconvenience") of pullover actions on other road users, whether they are actively operating along the same stretch of roadway (e.g., driving in the same or an adjacent lane) or if they are parked near a potential pick-up or drop-off location. The evaluation may not be symmetrical. For instance, the location could be viable for a quick drop-off (e.g., between 30-60 seconds to drop off a rider or deliver a package), but not viable for a pick-up if it is expected that the vehicle would have to wait longer (e.g., 3-5 minutes to pick up the rider or a package to be delivered). Signals that may affect a pullover decision can include the type of action (e.g., pick-up or drop-off), the length of time the vehicle will be stopped at the location, lane width, number of lanes, whether the vehicle would be at least partially stopped in a driving lane or a bike lane, the size of the gap for other road users to go around the vehicle, traffic flow at present and predicted for the time when the vehicle is stopped, whether parked vehicles would be blocked in by the stopped vehicle, how difficult it might be for a parked vehicle to pull out of its spot, etc.

Based on such signals, the vehicle's onboard systems, e.g., the planning system and/or the routing system, may select a particular location (spot) to pull over at or near the location of interest, or "fail" the pullover while searching for other suitable spots that may be farther or around the corner from the location of interest. The wait time at the location may be adjusted based on changes associated with dynamic signals, such as an increase in the amount of traffic approaching the vehicle's stopped location, a change in the expected arrival time of a rider, etc.

Example Vehicle Systems

Figure 1B:
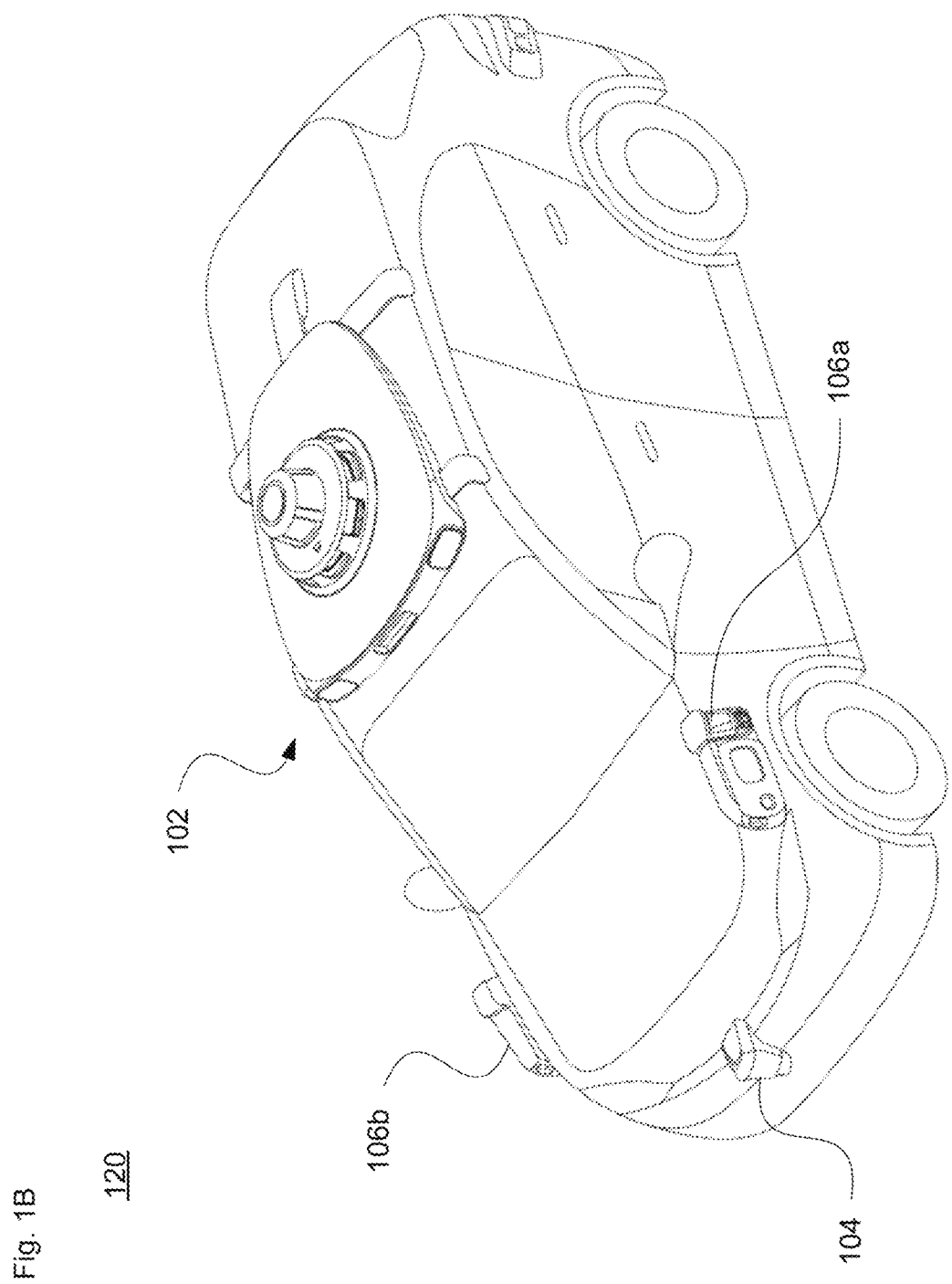
Figure 1C:
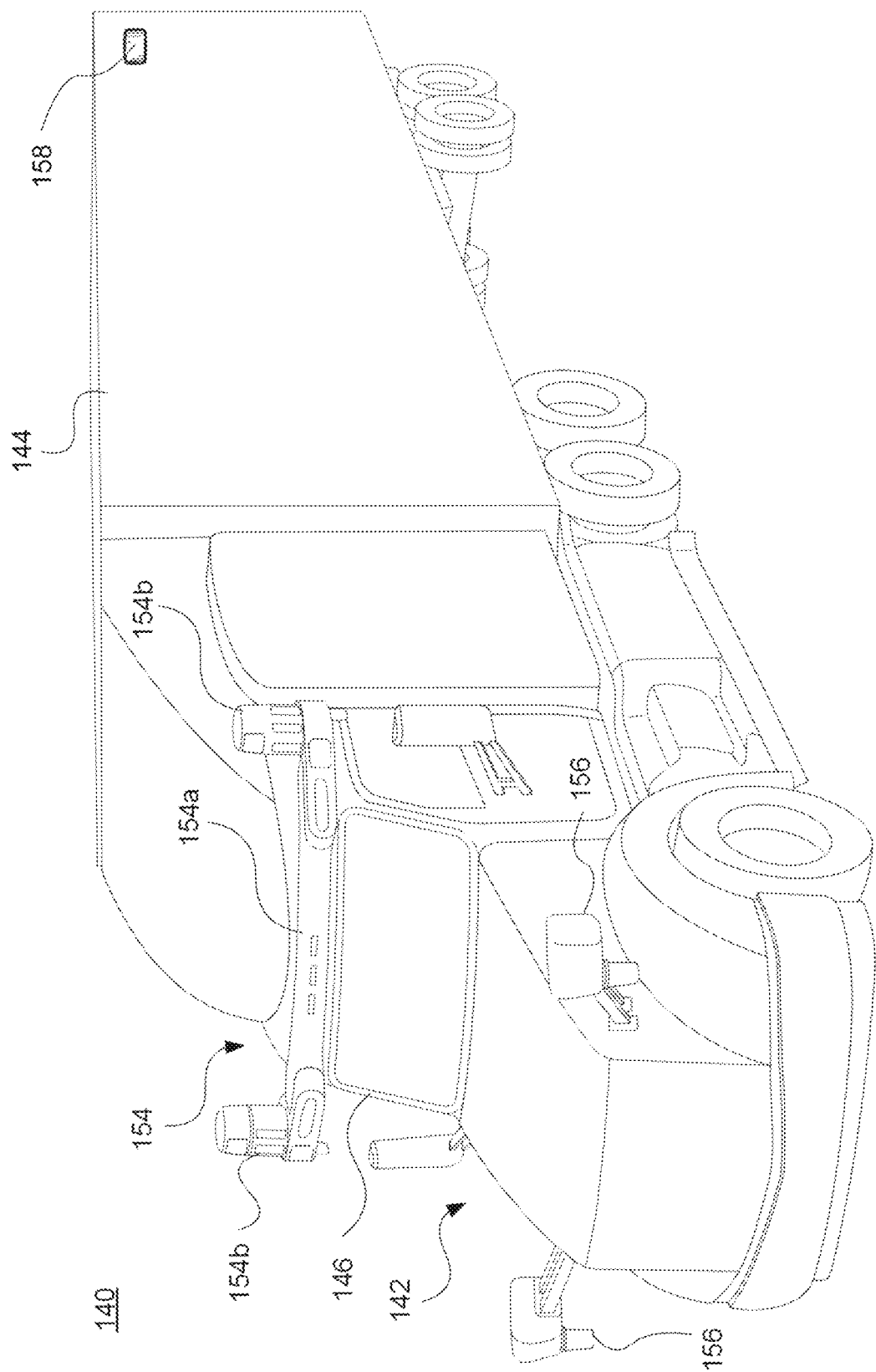
Figure 1D:
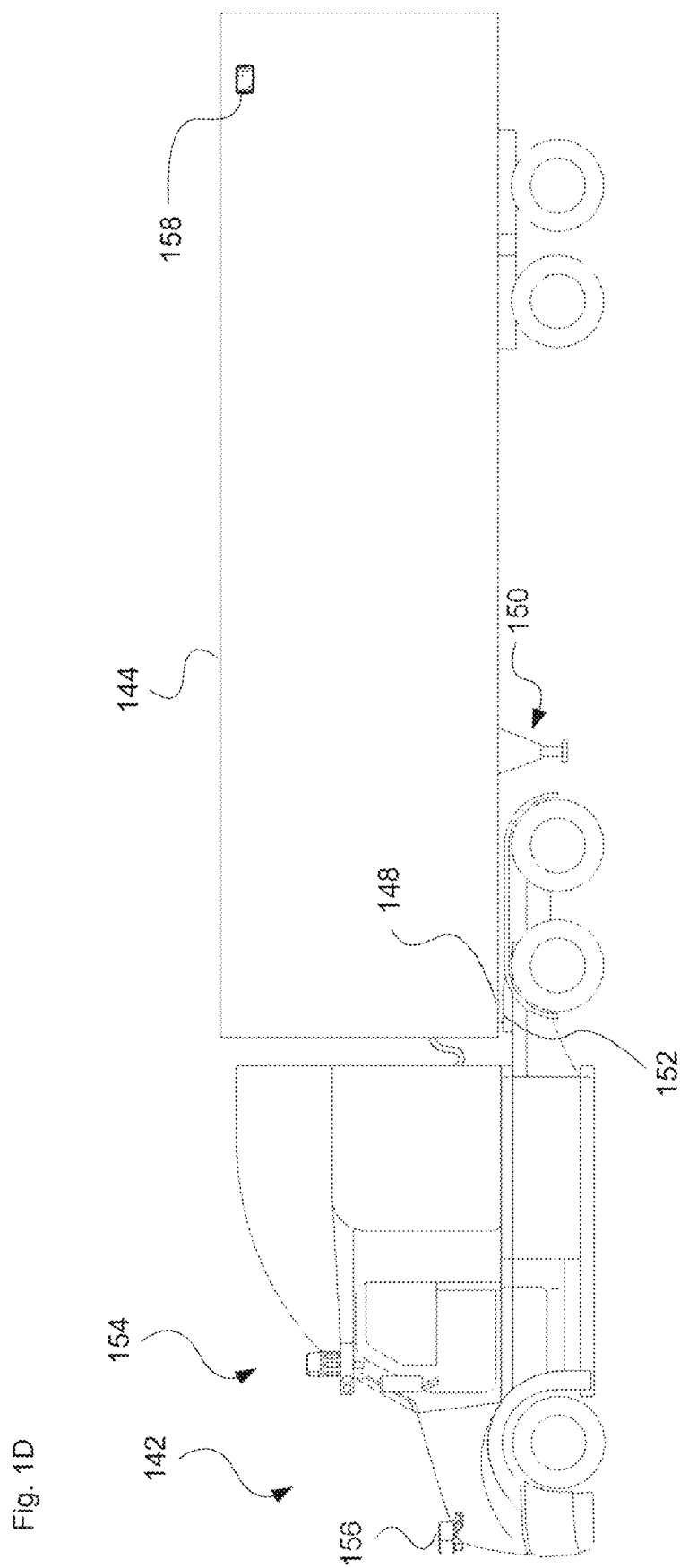

FIG. 1A illustrates a perspective view of an example passenger vehicle 100, such as a minivan or sport utility vehicle (SUV). FIG. 1B illustrates a perspective view of another example passenger vehicle 120, such as a sedan or crossover. The passenger vehicles may include various sensors for obtaining information about the vehicle's external environment. FIGS. 1C-D illustrate an example tractor-trailer type cargo vehicle 140. And FIG. 1E illustrates a smaller cargo vehicle 160, such as a panel truck for local deliveries.

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different autonomy levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed. In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode. The technology may be employed in all manner of vehicles configured to operate in an autonomous driving mode, including vehicles that transport passengers or items such as food deliveries, packages, cargo, etc. While certain aspects of the disclosure are particularly useful in connection with specific types of vehicles, the vehicle may be any type of vehicle including, but not limited to, cars, vans, motorcycles, cargo vehicles, buses, recreational vehicles, emergency vehicles, etc.

As shown in FIG. 1A, the vehicle may include a roof-top housing unit (roof pod assembly) 102 may include one or more lidar sensors as well as various cameras (e.g., optical or infrared), radar units, acoustical sensors (e.g., microphone or sonar-type sensors, ultrasonic sensors, or the like), inertial (e.g., accelerometer, gyroscope, etc.) or other sensors (e.g., positioning sensors such as GPS sensors). Housing unit 102 may have any number of different configurations, such as domes, cylinders, "cake-top" shapes, etc. Housing 104, located at the front end of vehicle 100, and housings 106a, 106b on the driver's and passenger's sides of the vehicle may each incorporate lidar, radar, camera, acoustical and/or other sensors. For example, housing 106a may be located in front of the driver's side door along a quarter panel of the vehicle. As shown, the passenger vehicle 100 also includes housings 108a, 108b for, e.g., radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

In this example, arrow 114 indicates that the roof pod 102 as shown includes a base section coupled to the roof of the vehicle. And arrow 116 indicated that the roof pod 102 also includes an upper section (e.g., with the dome, cylinder or cake-top shape) raised above the base section. Each of the base section and upper section may house different sensor units configured to obtain information about objects and conditions in the environment around the vehicle. The roof pod 102 and other sensor housings may also be disposed along vehicle 120 of FIG. 1B. By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

The example cargo vehicle 140 of FIGS. 1C-D is a tractor-trailer truck. The truck may include, e.g., a single, double or triple trailer, or may be another medium or heavy-duty truck such as in commercial weight classes 4 through 8. As shown, the truck includes a tractor unit 142 and a single cargo unit or trailer 144. The trailer 144 may be fully enclosed, open such as a flatbed, or partially open depending on the type of goods or other cargo to be transported. In this example, the tractor unit 142 includes the engine and steering systems (not shown) and a cab 146 for a driver and any passengers.

As seen in the side view of FIG. 1D, the trailer 144 includes a hitching point, known as a kingpin, 148, as well as landing gear 150 for when the trailer is detached from the tractor unit. The kingpin 148 is typically formed as a solid steel shaft, which is configured to pivotally attach to the tractor unit 142. In particular, the kingpin 148 attaches to a trailer coupling 152, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 154 and 156 disposed therealong. For instance, sensor unit 154 may be disposed on a roof or top portion of the cab. The sensor unit 154 may be a sensor suite having an elongated central member 154a with one or more types of sensors located therealong (e.g., camera and/or radar modules) and side members 154b that may include other sensor types (e.g., short range lidar modules capable of detecting objects within 10-25 meters of the vehicle and/or long range lidar modules capable of detecting objects beyond 15-20 meters and up to 100-250 meters). Sensor units 156 may be disposed on left and/or right sides of the cab. Sensor units may also be located along other regions of the cab, such as along the front bumper or hood area, in the rear of the cab, adjacent to the fifth-wheel, underneath the chassis, etc. The trailer 154 may also have one or more sensor units 158 disposed therealong, for instance along one or both side panels, front, rear, roof and/or undercarriage of the trailer 154.

The perspective view 160 of FIG. 1E illustrates an example panel truck or other vehicle that may be suitable for local deliveries (e.g., groceries, meals, mail or other packages, etc.). Here, in contrast to the roof-top housing unit 154 shown in FIGS. 1C-D, the truck 160 may have a pair of sensor assemblies disposed in housings 162 on either side of the vehicle.

As with the sensor units of the passenger vehicles of FIGS. 1A-B, each sensor unit of the cargo vehicle may include one or more sensors, such as lidar, radar, camera (e.g., optical or infrared), acoustical (e.g., microphone or sonar-type sensor), inertial (e.g., accelerometer, gyroscope, etc.) or other sensors such as geolocation-based (e.g., GPS) positioning sensors, load cell or pressure sensors (e.g., piezoelectric or mechanical), inertial (e.g., accelerometer, gyroscope, etc.).

Figure 2:
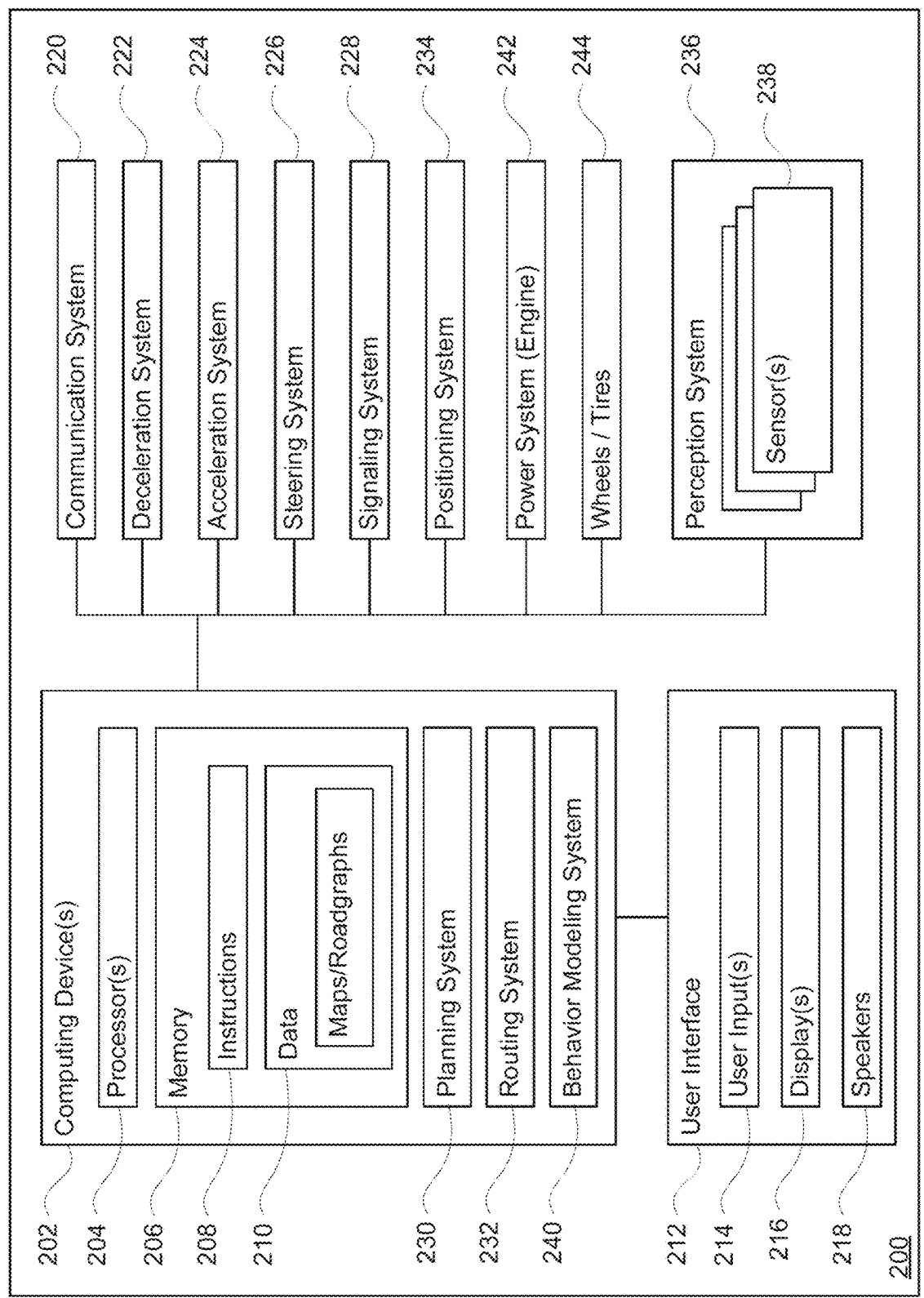
FIG. 2 illustrates components of a self-driving vehicle in accordance with aspects of the technology.

As shown in system diagram 200 of FIG. 2, the vehicle such as vehicle 100, 120 or 160 may have one or more computing devices, such as computing device 202 containing one or more processors 204, memory 206 and other components typically present in general purpose computing devices.

The memory 206 stores information accessible by the one or more processors 204, including instructions 208 and data 210 that may be executed or otherwise used by the processor(s) 204. The memory 206 may be of any type capable of storing information accessible by the processor, including a computing device of computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 210 may be retrieved, stored or modified by processor 204 in accordance with the instructions 208. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 204 may be any conventional processors, such as commercially available CPUs, GPUs or TPUs. Alternatively, the one or more processors may include a dedicated device such as an ASIC or other hardware-based processor. Although FIG. 2 functionally illustrates the processor, memory, and other elements of computing device 202 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 202. Accordingly, references to a processor or computing device will be understood to include references to a collection of processors or computing devices or memories that may or may not operate in parallel.

Computing devices 202 may include all of the components normally used in connection with a computing device such as the processor and memory described above as well as a user interface 212 having one or more user inputs 214 (e.g., one or more of a button, mouse, keyboard, touch screen, gesture input and/or microphone), various electronic displays 216 (e.g., a monitor having a screen or any other electrical device that is operable to display information), and speakers 218 to provide information to a passenger of the autonomous vehicle or other people as needed. For example, electronic display 216 may be located within a cabin of autonomous vehicle 100, 120 or 160 and may be used by computing devices 202 to provide information to passengers or delivery personnel within the autonomous vehicle 100, 120 or 160.

Computing devices 202 may also include a communication system 220 having one or more wireless connections to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 202 may be part of an autonomous control system for the autonomous vehicle 100, 120 or 160 and may be capable of communicating with various components of the vehicle in order to control the vehicle in an autonomous driving mode. For example, computing devices 202 may be in communication with various systems of autonomous vehicle 100, 120 or 160, such as deceleration system 222, acceleration system 224, steering system 226, signaling system 228, planning system 230 (also referred to as a planner/trajectory module), routing system 232, positioning system 234 (for determining the position of the vehicle such as its pose, e.g., position and orientation along the roadway or pitch, yaw and roll of the vehicle chassis relative to a coordinate system), perception system 236 having one or more sensors 238, behavior modeling system 240 (also referred to as a behavior module), and power system 242 in order to control the movement, speed, etc. of autonomous vehicle 100, 120 or 160 in accordance with the instructions 208 of memory 206 in the autonomous driving mode.

As an example, computing devices 202 may interact with deceleration system 222 and acceleration system 224 in order to control the speed of the vehicle. Similarly, steering system 226 may be used by computing devices 202 in order to control the direction of autonomous vehicle 100, 120 or 160. For example, if autonomous vehicle 100, 120 or 160 is configured for use on a road, such as a car or truck, steering system 226 may include components to control the angle of wheels 244 to turn the vehicle in accordance with a planned trajectory: Some of all of the wheels/tires 244 are coupled to deceleration, acceleration and/or steering systems. The computing devices 202 may be able to receive information about tire pressure, balance and other factors that may impact driving in an autonomous mode. Computing devices 202 may also use the signaling system 228 in order to signal the vehicle's intent to other drivers or vehicles, for example, by lighting turn signals or brake lights when needed.

Routing system 232 may be used by computing devices 202 in order to generate a route to a destination using map information. Planning system 230 may be used by computing device 202 in order to generate short-term trajectories that allow the vehicle to follow routes generated by the routing system. In this regard, the planning system 230 and/or routing system 232 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device, as such as the computing devices discussed below or other computing devices), pullover spots, vegetation, or other such objects and information.

The map information may be configured as a roadgraph. The roadgraph may include a plurality of graph nodes and edges representing features such as crosswalks, traffic lights, road signs, road or lane segments, bike lanes, parking spots, etc., that together make up the road network of the map information. Each edge is defined by a starting graph node having a specific geographic location (e.g., latitude, longitude, altitude, etc.), an ending graph node having a specific geographic location (e.g., latitude, longitude, altitude, etc.), and a direction. This direction may refer to a direction the autonomous vehicle 100 must be moving in in order to follow the edge (i.e., a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 232 may use the aforementioned map information to determine a route from a current location (e.g., a location of a current node) to a destination. Routes may be generated using a cost-based analysis which attempts to select a route to the destination with the lowest cost. Costs may be assessed in any number of ways such as time to the destination, distance traveled (in which each edge may be associated with a cost to traverse that edge), types of maneuvers required, convenience to passengers or the vehicle, convenience to other road users, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g., because it is faster) and therefore be preferable.

Positioning system 234 may be used by computing devices 202 in order to determine the vehicle's relative or absolute position on a map or on the earth. For example, the positioning system 234 may include a GPS receiver or to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of a roadgraph as well as relative location information, such as location relative to other cars immediately around it, which can often be determined with less noise than the absolute geographical location.

The positioning system 234 may also include other devices in communication with computing devices 202, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 236 includes one or more components (sensors 238) for detecting objects external to the vehicle such as other road users (vehicles, pedestrians, bicyclists, etc.) obstacles in the roadway, traffic signals, signs, trees, buildings, etc. For example, the sensors 238 of the perception system 236 may include lidar, sonar, radar, cameras, microphones (e.g., in an acoustical array for instance arranged along the roof pod 102), pressure or inertial sensors, strain gauges, and/or any other detection devices that generate and/or record data which may be processed by the computing devices of computing devices 202. In the case where the vehicle is a passenger vehicle such as a minivan 100 or ear 120, the vehicle may include lidar, cameras, and/or other sensors mounted on or near the roof, fenders, bumpers or other convenient locations as shown in FIGS. 1A-B.

Such sensors of the perception system 236 may detect objects in the vehicle's external environment and their characteristics such as location, orientation (pose) relative to the roadway, size, shape, type (for instance, vehicle, pedestrian, bicyclist, etc.), heading, speed of movement relative to the vehicle, etc., as well as environmental conditions around the vehicle. The perception system 236 may also include other sensors within the vehicle to detect objects and conditions within the vehicle, such as in the passenger compartment or storage compartment (e.g., trunk). For instance, such sensors may detect one or more persons, pets, packages, etc., as well as conditions within and/or outside the vehicle such as temperature, humidity, etc. Still further, sensors 238 of the perception system 236 may measure the rate of rotation of the wheels 244, an amount or a type of braking by the deceleration system 222, and other factors associated with the equipment of the vehicle itself.

The raw data obtained by the sensors (e.g., camera imagery, lidar point cloud data, radar return signals, acoustical information, etc.) can be processed by the perception system 236 and/or sent for further processing to the computing devices 202 periodically or continuously as the data is generated by the perception system 236. Computing devices 202 may use the positioning system 234 to determine the vehicle's location and perception system 236 to detect and respond to objects and roadway information (e.g., signage or road markings) when needed to reach the location safely, such as by adjustments made by planner/trajectory module 230, including adjustments in operation to deal with sensor occlusions and other issues.

In some instances, object characteristics may be input into a behavior prediction system software module of the behavior modeling system 240 which uses various behavior models based on object type to output one or more predicted future behaviors for a detected object. Object trajectories may be a list of positions and orientations or headings (e.g., poses) as well as other predicted characteristics such as speed, acceleration or deceleration, rate of change of acceleration or deceleration, etc. In other instances, the characteristics obtained from the perception system 236 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted future behaviors, various likelihoods from detection system software modules, the map information identifying the vehicle's environment, position information from the positioning system 234 identifying the location and orientation of the vehicle, a destination location or node for the vehicle, and/or feedback from various other systems of the vehicle may be input into a planning system software module of the planning system 230. The planning system 230 may use this input to generate trajectories for the vehicle to follow for some brief period of time into the future (e.g., over the next 1-10 seconds, or more or less) based on a route generated by a routing module of the routing system 232. In this regard, the trajectories may define the specific characteristics of acceleration, deceleration, speed, direction, etc. to allow the vehicle to follow the route towards reaching a destination. A control system software module of computing devices 202 may be configured to control movement of the vehicle, for instance by controlling braking, acceleration and steering of the vehicle, in order to follow a trajectory, a speed plan or a combination thereof.

The computing devices 202 may control the vehicle in one or more of the autonomous driving modes by controlling various components. For instance, by way of example, computing devices 202 may navigate the vehicle to a destination location completely autonomously using data from the detailed map information and planning system 230. Computing devices 202 may use the positioning system 234 to determine the vehicle's location and perception system 236 to detect and respond to objects when needed to reach the location safely. Again, in order to do so, computing device 202 and/or planning system 230 may generate trajectories and cause the vehicle to follow these trajectories, for instance, by causing the vehicle to accelerate (e.g., by supplying fuel or other energy to the engine or power system 242 by acceleration system 224), decelerate (e.g., by decreasing the fuel supplied to the engine or power system 242, changing gears, and/or by applying brakes by deceleration system 222), change direction (e.g., by turning the front or rear wheels of autonomous vehicle 100, 120 or 160 by steering system 226), and signal such changes (e.g., by lighting turn signals) using the signaling system 228. Thus, the acceleration system 224 and deceleration system 222 may be part of a drivetrain that includes various components between an engine of the vehicle and the wheels of the vehicle. Again, by controlling these systems, computing devices 202 may also control the drivetrain of the vehicle in order to maneuver the vehicle autonomously.

Figure 3A:
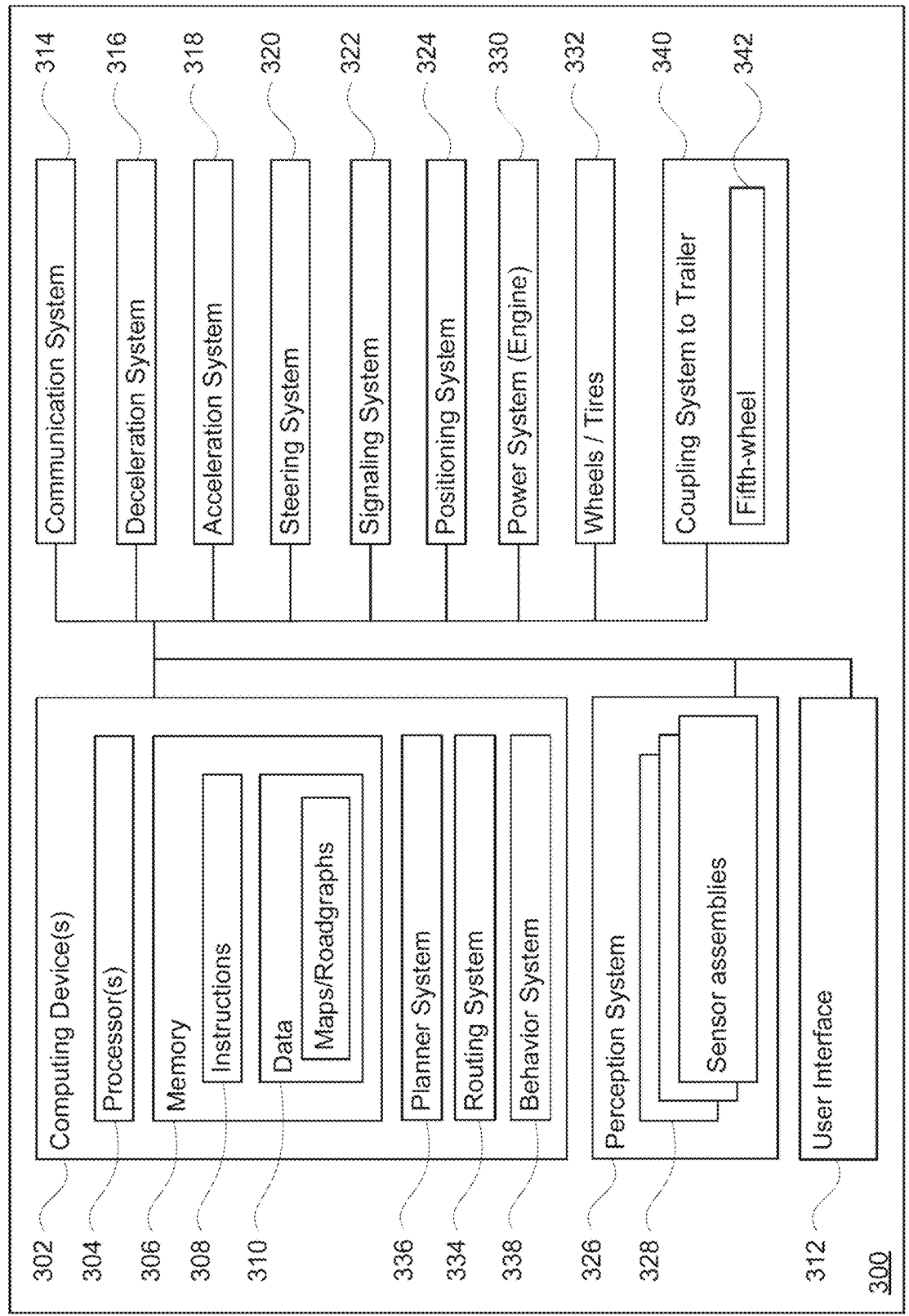
FIGS. 3A-B are block diagrams of systems of an example cargo-type vehicle in accordance with aspects of the technology.

FIG. 3A illustrates a block diagram 300 with various components and systems of a vehicle, e.g., vehicle 140 of FIGS. 1C-D. By way of example, the vehicle may be a truck, farm equipment or construction equipment, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2. For instance, the data may include map-related information (e.g., roadgraphs).

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308. Here, as above, the system may include a user interface 312 having one or more user inputs, various electronic displays, and speakers.

In one example, the computing devices 302 may form an autonomous driving computing system incorporated into vehicle 140. Similar to the arrangement discussed above regarding FIG. 2, the autonomous driving computing system of block diagram 300 may be capable of communicating with various components of the vehicle in order to perform route planning and driving operations. Communication system 314 may provide one or more wireless connections in the manner described above for communication system 220. In addition or alternatively, the communication system may include the vehicle's internal communication bus (e.g., a Controller Area Network (CAN) bus or a FlexRay bus).

For example, the computing devices 302 may be in communication with various systems of the vehicle, such as a driving system including a deceleration system 316, acceleration system 318, steering system 320, signaling system 322, and a positioning system 324, each of which may function as discussed above regarding FIG. 2.

The computing devices 302 are also operatively coupled to a perception system 326 having one or more sensor assemblies 328, as well as a power system 330. Some or all of the wheels/tires 332 are coupled to the driving system, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information, routing system 334, planner system 336 and/or behavior system 338. For instance, computing devices 302 may employ a planner/trajectory module of the planner system 336 in conjunction with the positioning system 324, the sensor assemblies 328 of the perception system 326 and the routing system 334 to detect and respond to objects when needed to reach the location safely, similar to the manner described above for FIG. 2.

Similar to perception system 236, the perception system 326 also includes one or more sensors or other components such as those described above for detecting objects external to the vehicle, objects or conditions internal to the vehicle, and/or operation of certain vehicle equipment such as the wheels and driving system. Each sensor assembly 328 may include one or more sensors. In one example, a pair of sensor assemblies 328 may be arranged as sensor towers integrated into the side-view mirrors on the truck, farm equipment, construction equipment or the like. In another example, sensor assemblies 328 may also be positioned at different locations on the tractor unit 142 or on the trailer 144, as noted above with regard to FIGS. 1C-D. The computing devices 302 may communicate with the sensor assemblies located on both the tractor unit 142 and the trailer 144. Each assembly may have one or more types of sensors such as those described above.

Also shown in FIG. 3A is a coupling system 340 for connectivity between the tractor unit and the trailer. The coupling system 340 may include one or more power and/or pneumatic connections (not shown), and a fifth-wheel 342 at the tractor unit for mechanical connection to the kingpin at the trailer.

Figure 3B:
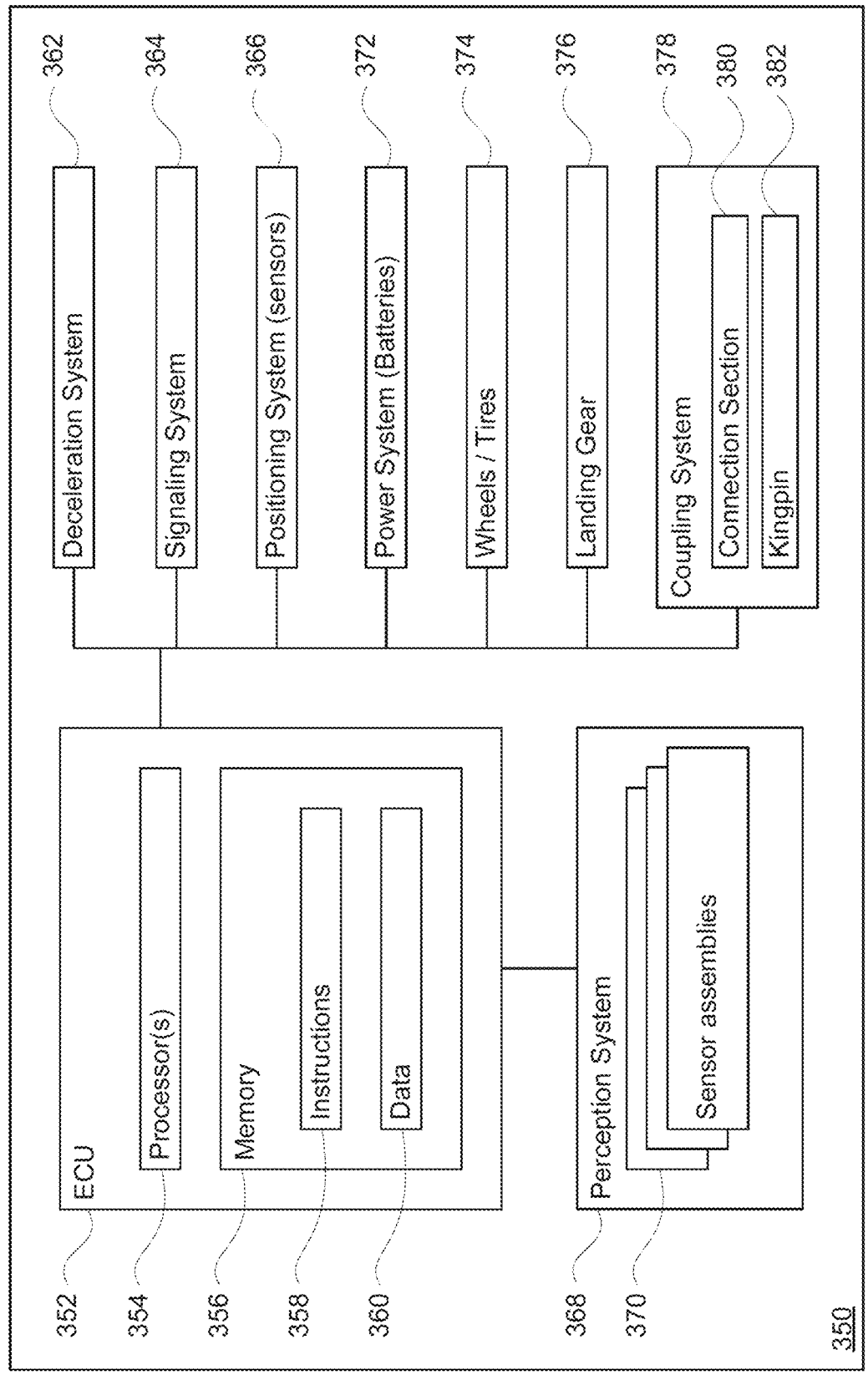

FIG. 3B illustrates a block diagram 350 of systems of an example trailer, such as trailer 144 of FIGS. 1C-D. As shown in this example, the system includes a trailer ECU 352 of one or more computing devices, such as computing devices containing one or more processors 354, memory 356 and other components typically present in general purpose computing devices. The memory 356 stores information accessible by the one or more processors 354, including instructions 358 and data 360 that may be executed or otherwise used by the processor(s) 354. The descriptions of the processors, memory; instructions and data from FIGS. 2 and 3A apply to these elements of FIG. 3B.

The trailer ECU 352 in this example is configured to receive information and control signals from the tractor unit, as well as information from various trailer components. The on-board processors 354 of the ECU 352 may communicate with various systems of the trailer, including a deceleration system 362, signaling system 364, and a positioning system 366. The ECU 352 may also be operatively coupled to a perception system 368 with one or more sensors arranged in sensor assemblies 370 for detecting objects in the trailer's driving environment. The ECU 352 may also be operatively coupled with a power system 372 (for example, a battery power supply) to provide power to local components. Some or all of the wheels/tires 374 of the trailer may be coupled to the deceleration system 362, and the processors 354 may be able to receive information about tire pressure, balance, wheel speed and other factors that may impact driving in an autonomous mode, and to relay that information to the processing system of the tractor unit. The deceleration system 362, signaling system 364, positioning system 366, perception system 368, power system 372 and wheels/tires 374 may operate in a manner such as described above with regard to FIGS. 2 and 3A.

The trailer also includes a set of landing gear 376, as well as a coupling system 378. The landing gear may provide a support structure for the trailer when decoupled from the tractor unit. The coupling system 378, which may be a part of coupling system 340 of FIG. 3A, provides connectivity between the trailer and the tractor unit. Thus, the coupling system 378 may include a connection section 380 (e.g., for communication, power and/or pneumatic links to the tractor unit). In this example, the coupling system also includes a kingpin 382 configured for connectivity with the fifth-wheel of the tractor unit.

Map Information for Pick-Up and Drop-Off Locations

Figure 4A:
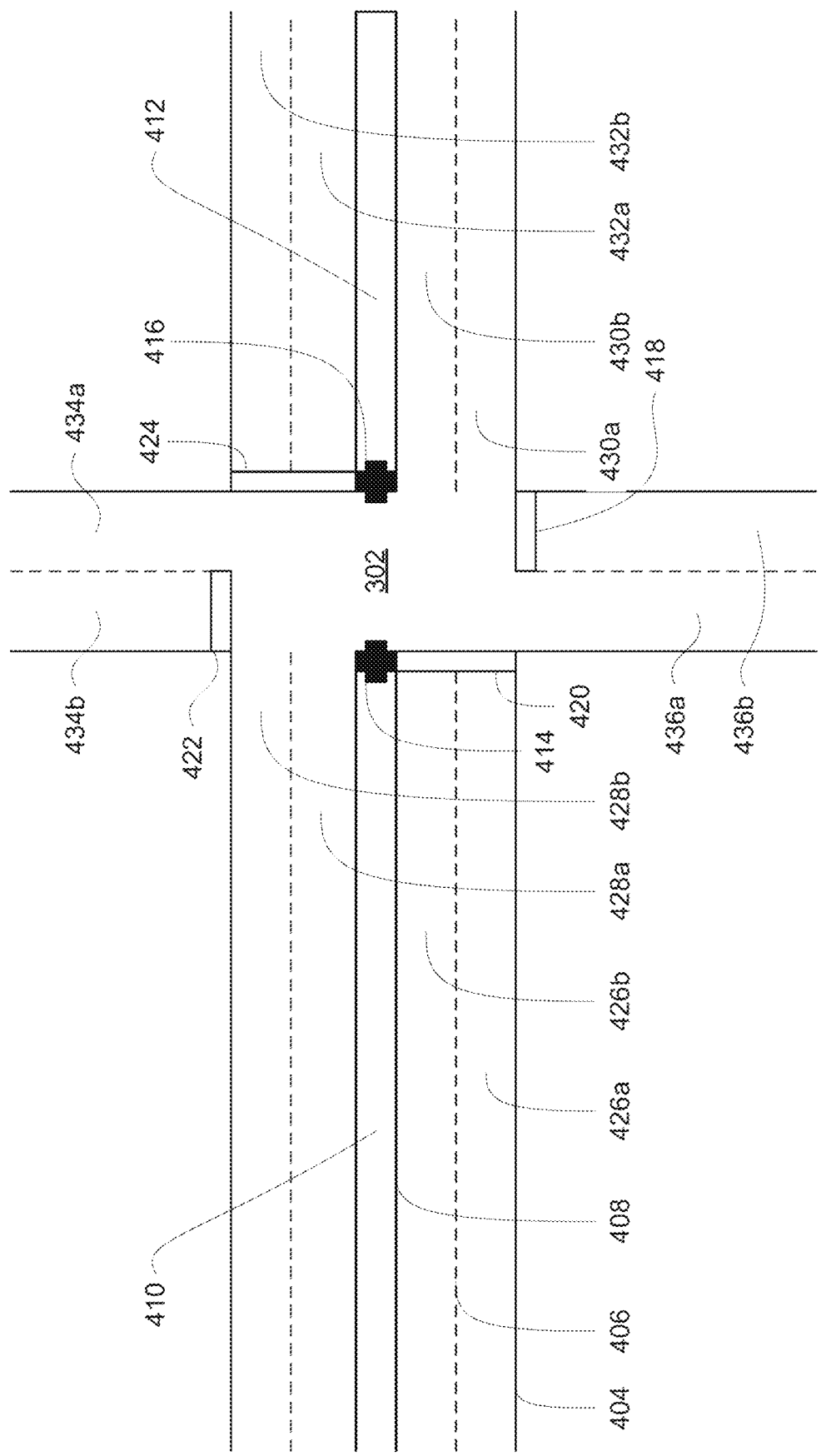
FIGS. 4A-B illustrate map information in accordance with aspects of the technology.
Figure 4B:
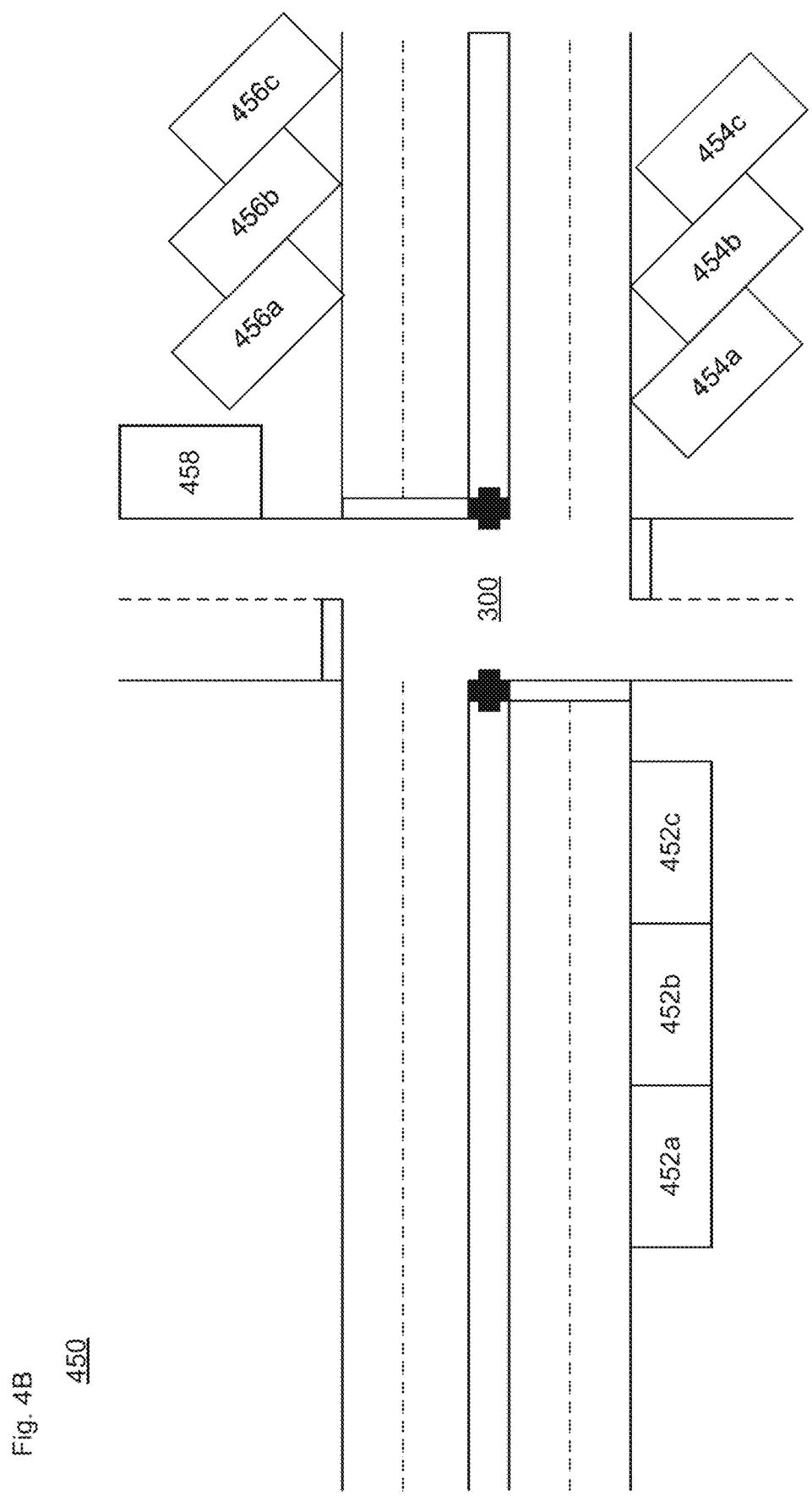

FIGS. 4A-B illustrate example of map information for a section of roadway. As shown in view 400 of FIG. 4A, the roadway includes intersection 402. FIG. 4A depicts certain map information that includes information identifying the shape, location, and other characteristics of lane markers or lane lines 404, 406, 408, median areas 410, 412, traffic signals 414, 416, as well as stop lines 418, 420, 422, 424. The lane lines may also define various lanes (e.g., 426*a-b*, 428*a-b*, 430*a-b*, 432*a-b*, 434*a-b* and 436*a-b*) or these lanes may also be explicitly identified in the map information. In addition to these features, the map information (e.g., roadgraphs) may also include information that identifies the direction of traffic, speed limits for each lane, as well as information that allows the system to determine whether the vehicle has the right of way to complete a particular maneuver (e.g., complete a turn, change lanes, cross a lane of traffic or proceed through an intersection), as well as other features such as curbs, buildings, waterways, vegetation, signs, etc.

The map information may identify pullover locations, which may include one or more areas where a vehicle is able to stop and to pick up or drop off riders (or meals, groceries, packages or other cargo). These areas may correspond to parking spaces, waiting areas, turn-offs, shoulders, parking lots or other places where the vehicle may wait prior to picking up the rider. For instance, FIG. 4B depicts a view 450 showing parking areas 452-458 adjacent to different portions of the roadway. In particular, in this view the parking areas 452*a-c* are adjacent to lane 426*a*, head-in parking areas 454*a-c* are adjacent to lane 430*a*, parking areas 456*a-c* are adjacent to lane 432*b*, and parking area 458 is adjacent to lane 434*a*. In this example, parking areas 452*a-c* and 458 may be parallel parking spots, while parking areas 454*a-c* and 456*a-c* may be angled parking spots.

In one scenario, these locations may correspond to parking spaces, but in other scenarios such locations may correspond to any type of area in which a vehicle is able to stop to pick up and drop off passengers or cargo, such as a loading zone or marked curb region designated for certain temporary idling or stopping activities. For instance, curb striping or other pavement markings may use a white color (or no color) to indicate parking is permitted; a blue color to indicate parking only for vehicles with disabled parking placards or license plates; a green color to indicate parking is permitted for a limited period of time (e.g., 5-15 minutes); a yellow color to indicate vehicles are permitted to pull over only to load or unload passengers; and/or a red color to indicate a no-parking zone. Signage or other indicia may also be used to indicate whether parking is permitted, how long a vehicle can park, which vehicles may park at the location, etc.

The locations may be associated with time of day, holiday, street sweeping, garbage collection or other regulations that may limit when pickups or drop offs may be performed, such as no parking when the road is snow covered. This information may be updated periodically, for instance every week (or more or less), based on locations where vehicles of the fleet or other vehicles are observed being stopped or pulled over.

Example Pick-Up and Drop-Off Situations

There may be many different types of situations where a vehicle operating in an autonomous driving mode may need to evaluate or make a change to its pick-up or drop-off plan. The following presents a few interesting stopping situations. How the vehicle may use various signals to address inconvenience to moving traffic and parked road users in these and other situations is considered in the subsequent discussion.

Figure 5A:
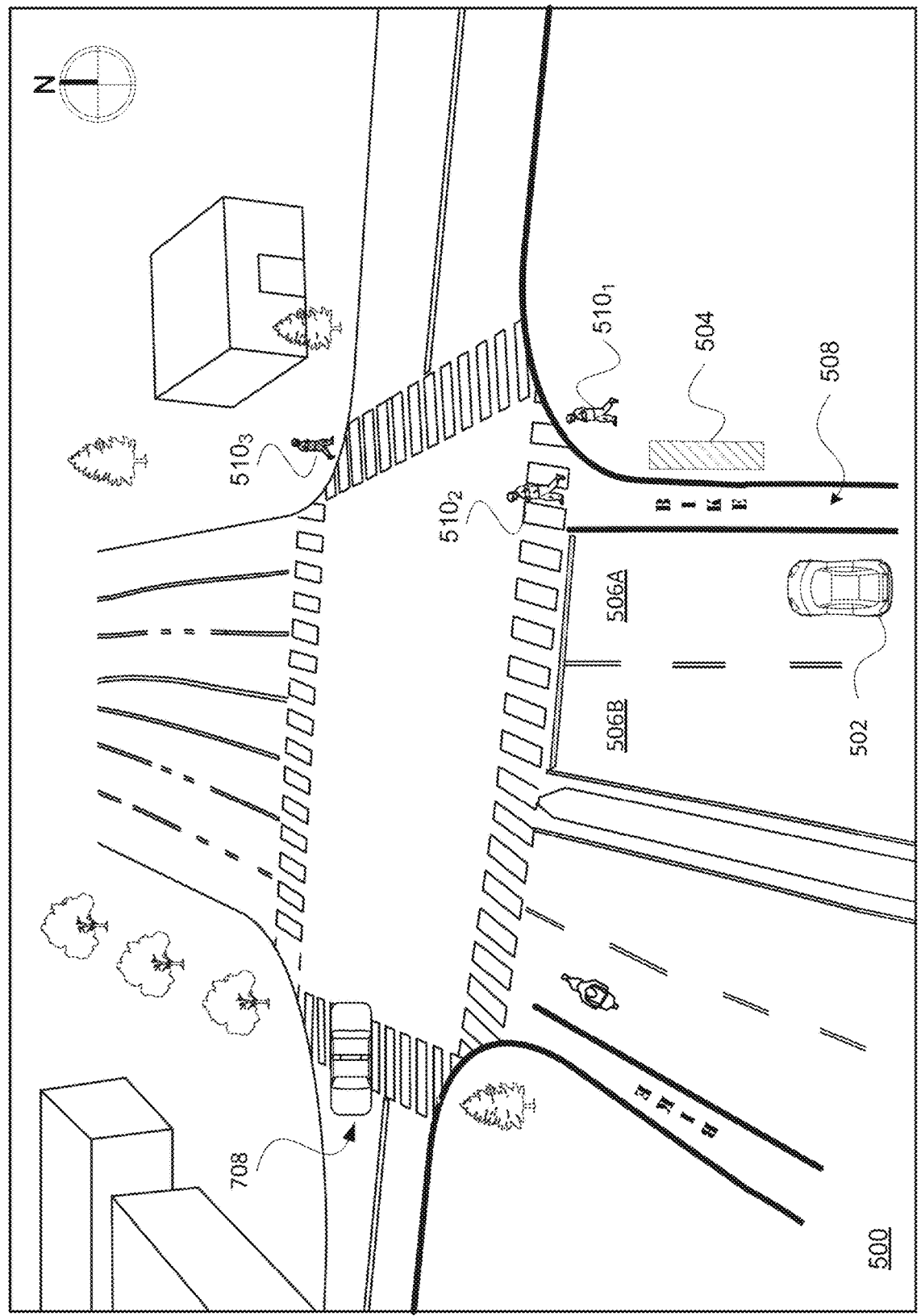
FIGS. 5A-B illustrate a bike lane pullover situation in accordance with aspects of the technology.
Figure 5B:
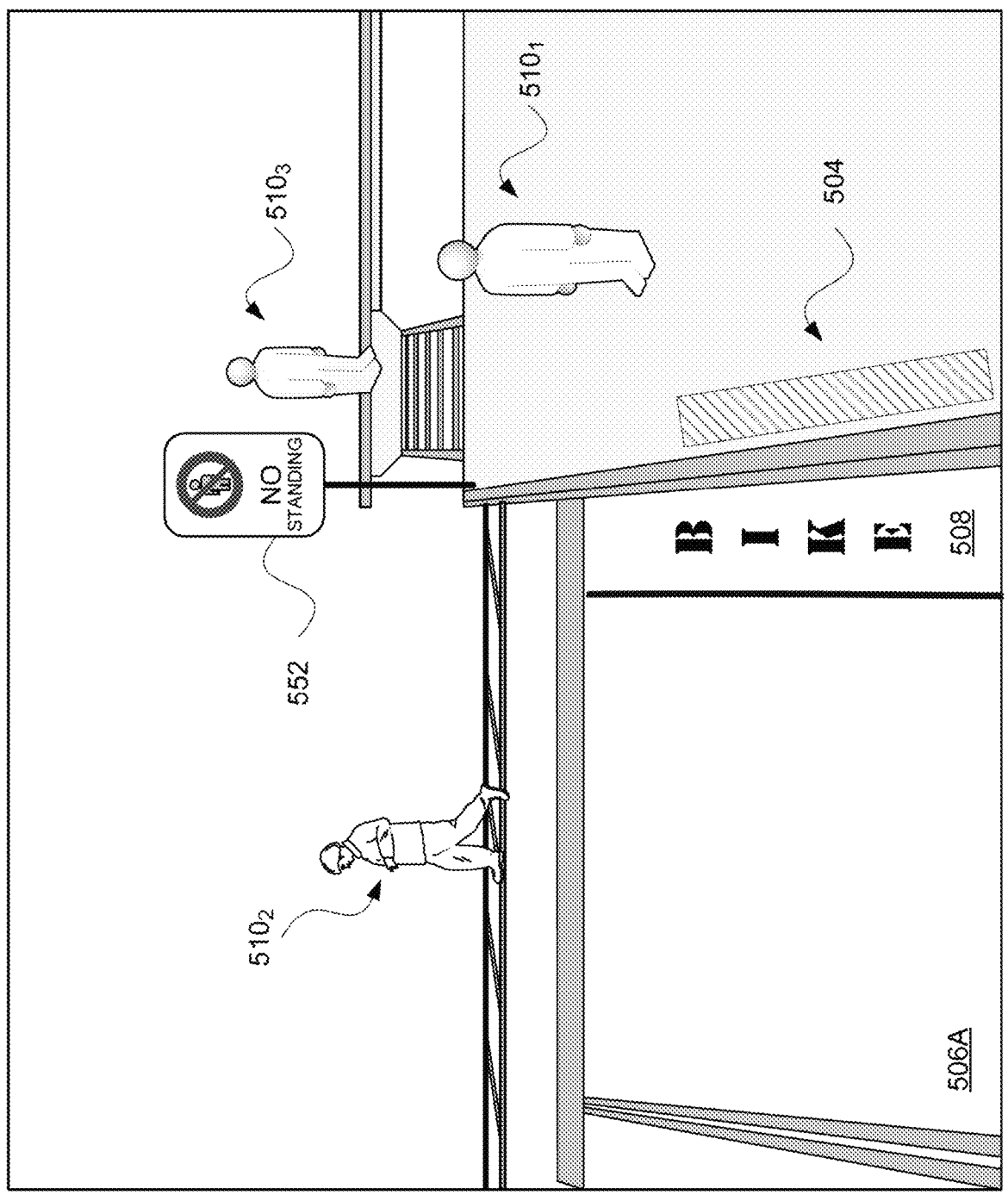

FIGS. 5A-B illustrate an example 500 of a bike lane pullover situation. As shown in FIG. 5A, vehicle 502 is arriving at pickup location 504 facing northbound on a first road segment. This road segment is shown having two lanes 506A (right) and 506B (left), with a bike lane 508 between lane 506A and the curb. The perception system of vehicle 502 may detect a number of pedestrian objects $510_1 \ldots 510_i$ in the nearby environment. And as shown in view 550 of FIG. 5B, the perception system may also identify a no standing sign 552 or other signage that may restrict where or how long vehicles may pull over. In this example, the vehicle may determine that temporarily stopping in the bike lane may be suitable to pick up a passenger, such as pedestrian $510_1$, because no bicyclists are determined to be in the bike lane and no approach vehicles are in the adjacent lane 506A for at least some minimum amount of time (e.g., the next 20-60 seconds).

FIG. 6 illustrates an example 600 of an extended stop in lane situation. Here, vehicle 602 has arrived at pickup location 604, which is adjacent to the eastbound road segment. This road segment has two lanes, namely 606A (right) and 606B (left), with no bike lane or other gap between lane 606A and the curb. In this example, the vehicle may evaluate how long it will likely need to stop in lane 606A in view of various signals. This can include using static (e.g., roadgraph or other map) information to determine a difficulty of changing the pickup location to a spot 608 around the corner on southbound lane 610, which may not be close to the intersection due to fire hydrant 612. The evaluation can also include a likelihood of a car 614 or other road user approaching along the eastbound direction in lane 606A. Here, the system may consider dynamic signals such as a distance 616 between the vehicle 602 and the car 614 and how that may change in view of the expected time remaining at the pickup location 604. It may also consider other dynamic signals such as the size of a lateral gap 618 for other road users to go around the vehicle, either within the lane 606A or by shifting over into the adjacent lane 606B. This may be impacted by other traffic traveling in lane 606B.

FIG. 7 illustrates an example 700 of a loading zone situation. Here, vehicle 702 may be approaching a mall, airport terminal, train station or other facility 704 that has a loading zone 706. In this example, a number of other vehicles 708 are currently parked in the loading zone 706 upon the arrival of vehicle 702. Depending on when rider(s) 710 are expected to be at the pickup location and the "curb occupancy" of the loading zone 706 (e.g., how crowded the loading zone is, vehicle turnover in the loading zone, and/or how frequently vehicles are observed departing the loading zone), the vehicle 702 may either elect to wait for a spot to open up in the loading zone, circle around the facility 704 and try the pickup again in a few minutes, or double park such as in lane 712A. Similar to the situation discussed above with regard to FIG. 6, the vehicle's system may consider dynamic signals such as a distance between the vehicle 702 and other approaching road users and how that may change in view of the expected time remaining in order to pick up the rider(s) 710. It may also consider other dynamic signals such as a lateral gap size for other road users to go around the vehicle, either within the lane 712A or by shifting over into the adjacent lane 712B. This may be impacted by other traffic traveling in lane 712B. In this loading zone situation, the system may also consider inconvenience to vehicles in the loading zone that may either be temporarily blocked in or that may need to maneuver around the vehicle 702 to pull out of the loading zone.

Figure 8A:
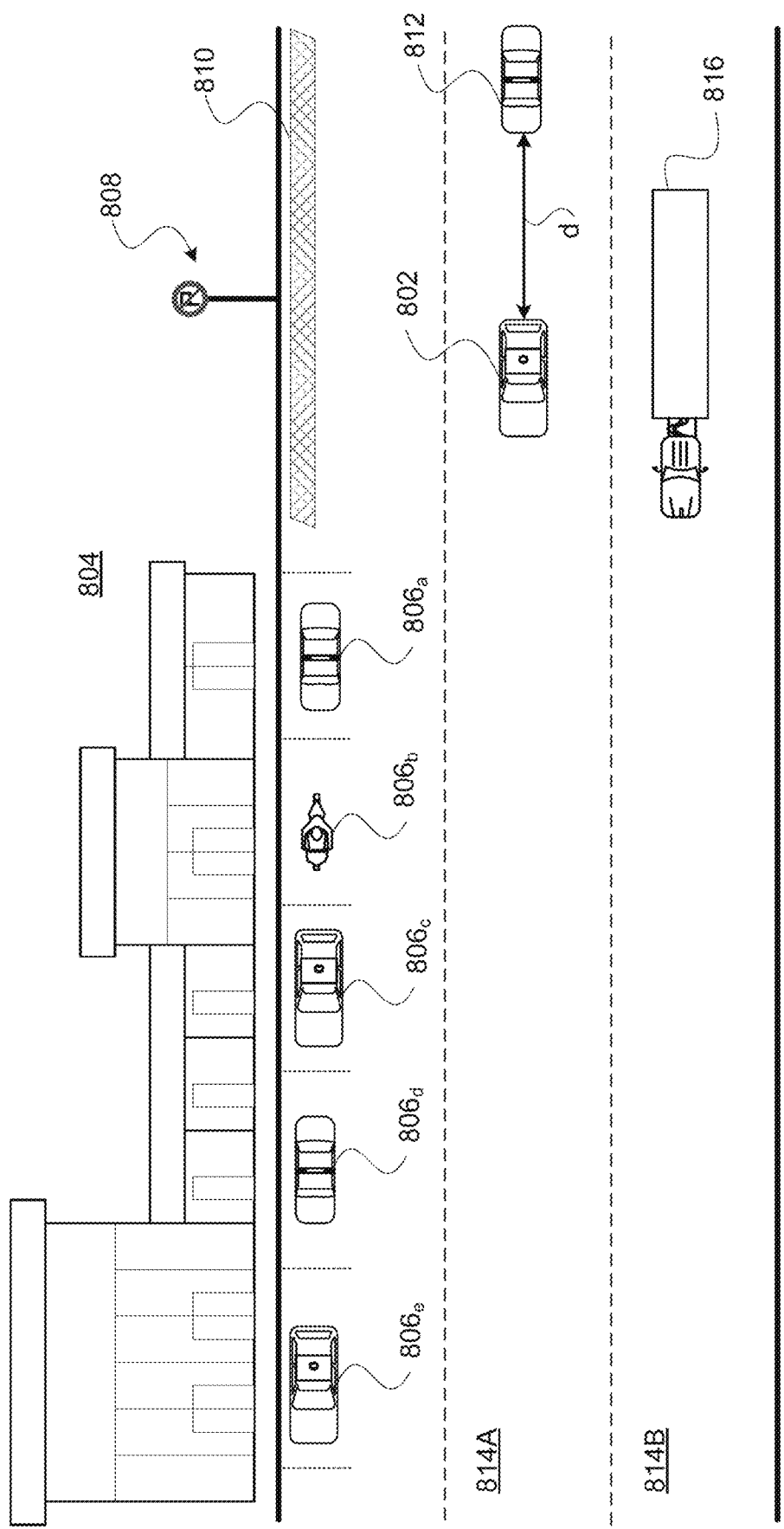
FIGS. 8A-B illustrate double-parking situations in accordance with aspects of the technology.
Figure 8B:
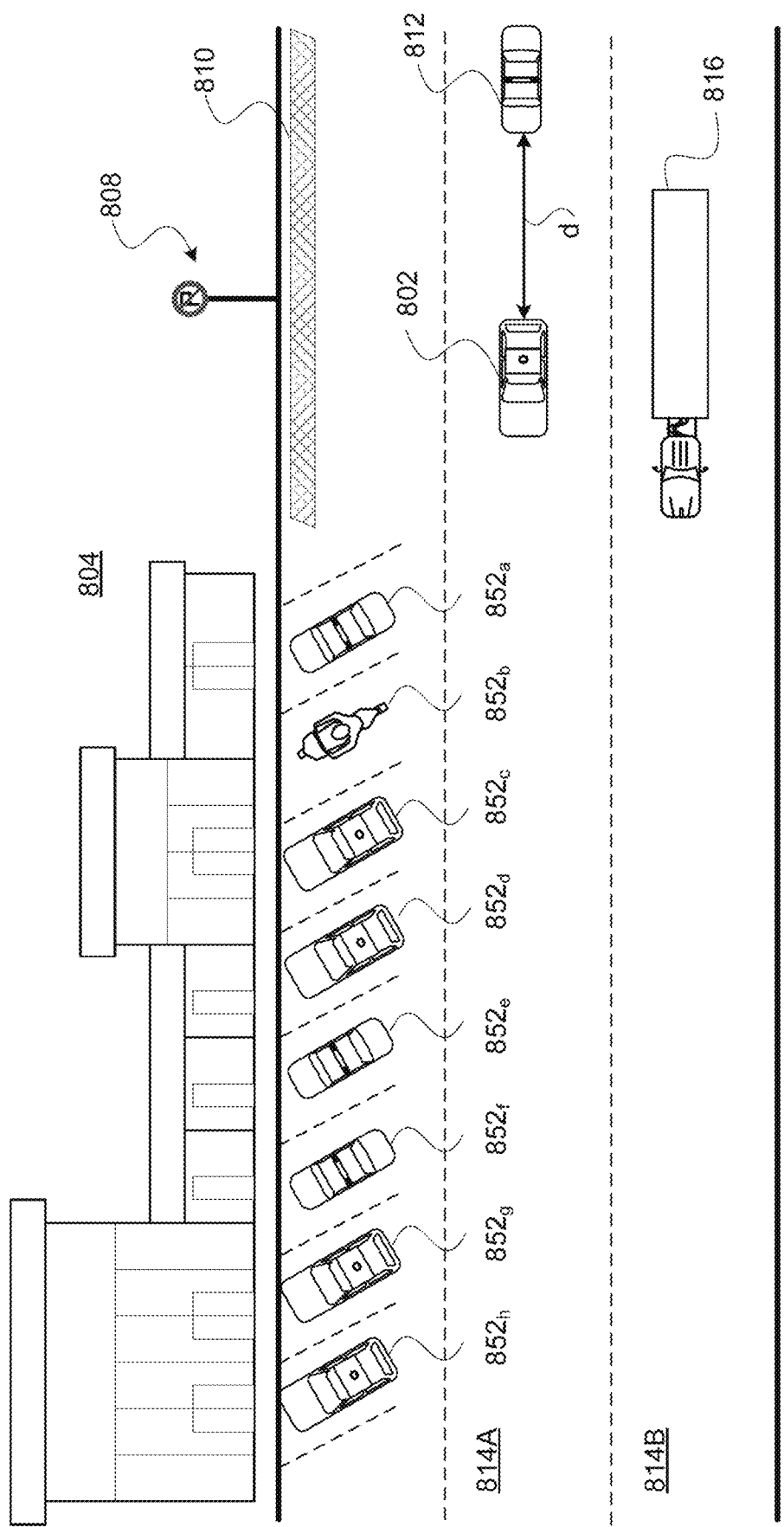

FIGS. 8A-B illustrate double parking situations. As shown in view 800 of FIG. 8A, vehicle 802 may be attempting to part by a row of stores 804 in other to pick up a rider or a package. Here, a number of other vehicles $806_a \ldots 806_e$, are parked in front of the stores 804. As shown by no-parking sign 808 and roadway marking 810, the curb area adjacent to the stores 804 and the parallel parking spots is a no-parking zone. Thus, one option is for the vehicle 802 to double park, potentially blocking in one or more of the parked vehicles 806. Here, similar to the situation discussed above with regard to FIG. 7, the vehicle's system may consider dynamic signals such as a distance (d) between the vehicle 802 and other approaching road users such as vehicle 812, and how that may change in view of the expected time remaining in order to pick up the rider or package. It may also consider other dynamic signals such as a lateral gap size for other road users such as car 812 to go around the vehicle 802, either within the lane 814A or by shifting over into the adjacent lane 814B. This may be impacted by other traffic traveling in lane 814B, such as truck 816. In this double-parking situation, the system may also consider inconvenience to vehicles in the parking spaces that may either be temporarily blocked in or that may need to maneuver around the vehicle 802 to pull out. FIG. 8B illustrates a similar situation 850, except that instead of parallel parking spots, the spaces in front of the row of stores 804 are angled for head-in parking. Here, vehicles $852_a \ldots 852_h$, are parked in the available spots. In this example, the system may perform a similar evaluation as for FIG. 8A; however, the number of parked vehicles that are impacted by being blocked in or the maneuvers required by parked vehicles to pull out may change the inconvenience level for one or more of the vehicles 852.

FIG. 9 illustrates a driveway blocking situation. As shown in view 900 of the figure, a number of properties are illustrated via dash-dot lines, which include houses 902A-B and apartments or condos 902C. Map information (e.g., a roadgraph) associated with such properties may be collected from administrative records or manually labeled by a human operator. For example, the location may be identified as being in a residential area (as shown) or a commercial area, etc. The map information may include the shape, location, and other characteristics of road sections 904A and 904B. For example, map information 200 may include an indication that each road section 904A and 904B permits one-way traffic, such as westbound along section 904A and eastbound along section 904B. The map information may also include a lane marker or lane line 906. As an alternative to lane lines or markers, lanes may also be inferred by the width of a road.

The map information may further include width, length, curvature, and/or shape for each lane or road section, Map information may also include information that identifies the direction of traffic and speed limits for each lane as well as information that allows the computing system of vehicle 908 to determine whether the vehicle has the right of way to complete a particular type of maneuver (e.g., complete a turn, cross a lane of traffic or intersection, etc.). In addition to these features, the map information may further include signs and markings on the roadway with various characteristics and different semantic meanings. For example, signage may include a speed limit sign, a stop sign, a yield sign, a pedestrian walk sign, a parking restriction sign, etc. Map information may additionally include other features such as curbs (for example curb 910), waterways, vegetation, driveways (such as driveways 912A and 912B), etc.

By controlling the vehicle 908 to position itself clear from ongoing traffic and objects on the driveways, such as cars 914A and 914B, the vehicle 908 may be less likely to block or inconvenience the passenger or other road users such as motorcyclist 916 parked between driveways 912A and 912B.

Signals to Determine Inconvenience to Other Road Users

Not all pick-ups or drop-offs are equal. For instance, in a dense urban environment or a suburban neighborhood with restrictive on-street parking regulations, the context of a stop can determine whether it is an appropriate one, how long the vehicle should remain stopped, and what information should be communicated to riders or users about the stop. In many situations it may be unclear to the vehicle whether to stop, for how long, or when to modify its stopping decision. This could cause the vehicle to contact a remote assistance service for support, where remote assistance can involve support personnel evaluating real-time conditions and instructing the vehicle how to respond (e.g., continue waiting at a stopping location or "move along" to another possible stopping location or just drive around the block to see if things will change). However, this can be time consuming and require substantial resources, especially when there is a fleet of vehicles performing pick-ups and drop-offs.

In order to address such issues, a robust inconvenience approach is introduced that can aid the contextual determination and reduce reliance on remote assistance for stopping decisions. This inconvenience approach may categorize a pick-up or drop-off stopping scenario as being either likely-inconvenient or unlikely-inconvenient to other road users. The other road users may be cars or other vehicles traveling in the same lane or an adjacent lane, bicyclists in a bike lane, people at or near a crosswalk or wheelchair ramp, parked vehicles that might become blocked in by a stopping (double parking) maneuver, etc.

The inconvenience logic includes evaluating whether the stopping (pick-up or drop-off) location itself is obstructing to other road users (e.g., based on static signals) and whether there are any road users near the vehicle (e.g., based on dynamic signals). In many scenarios, should both aspects be true, the system may deem it as likely-inconvenient situation; otherwise, the system may deem it as unlikely-inconvenient situation. FIG. 10 illustrates an example 1000 of an inconvenience determination process. In block 1002, the system identifies a stopping location for a pick-up or a drop-off. This may be done in response to a query from a rider or other user (e.g., a parent arranging a ride for the child to school, or an adult arranging a ride for their elderly relative to an appointment). At block 1004, the system determines whether the location would be obstructing. This can be done by evaluating static signals including roadgraph or other map data (e.g., would the stopping location be in a bike lane, an extended stop in the lane adjacent to the curb, next to the crosswalk, a driveway or a wheelchair ramp, is there signage indicating no stopping or standing along a stretch of curb at the stopping location, etc.), a vehicle model to identify how much of a lateral gap may exist during stopping, and/or other static signals. Upon determination that the location is not obstructing, the result at block 1006 is that this is not an obstructing situation, so the vehicle can proceed with stopping at the identified location.

Should the evaluation indicate that the location may be obstructing to one or more road users or other actors, the process continues at block 1008, where the system evaluates whether there is another road user nearby. When the system determines that there is not another nearby road user that would be inconvenienced by the stopped vehicle, then the process proceeds to block 1010 with a determination that the vehicle is unlikely-obstructing. Here, the vehicle can continue with the pick-up or drop-off as planned. As shown by the dashed line, the evaluation process may return to block 1004 to consider any new signals that might affect the inconvenience analysis. When the system determines that there is another nearby road user that would be inconvenienced, then the process proceeds to block 1012 with a determination that the vehicle is likely-obstructing. Here, the vehicle may take different actions, such as driving around the block or pulling up closer to the curb in order to minimize or otherwise reduce the inconvenience to other road users. As shown by the dash-dot line, the evaluation process may return to block 1002 should the system change to a different stopping location.

"Nearby" may be considered in distance and/or time, and may be dependent on the type of road user, posted or detected speed limit or other factors. For instance, a car approaching along the same lane in which the vehicle is performing an extended stop in lane may be determined to be nearby when it is within 250 meters, the detected speed of the car is 40 kph (~25 mph), and the time until a pickup is complete is expected to exceed 30 seconds. In this example, if the vehicle model indicates there may be an insufficient lateral gap for the car to pass in the lane, and there is too much traffic in an adjacent lane, then the system could cause the vehicle to cut short the pickup an instead circle around the block to try again. In contrast, if the road user is a bicyclist instead of a car, the system may determine that the time until pickup is more than sufficient before the bicyclist would arrive at the stopping location and/or that there is an ample lateral gap for the bicyclist to pass the stopped vehicle.

In a likely-inconvenient situation, the vehicle's planner and/or routing systems may try to identify other candidate stopping locations to perform the pick-up or drop-off. In an unlikely-inconvenient situation, such onboard systems may cause the vehicle to stop at the given location, while continuing to monitor dynamic signals (e.g., based on received sensor data) and/or static signals to determine whether the detection of new road users or environmental conditions may change the determination to likely-inconvenient. Or the unlikely-inconvenient determination may remain the same, for instance because the time remaining in the stop duration has diminished (e.g., a pick-up or drop-off is expected to be completed within the next 10-15 seconds, or more or less), or a newly detected road user such as a car is sufficiently far behind the vehicle (e.g., more than 100 meters away) and has an adequate lateral gap to pass around the vehicle (e.g., there is at least a 1.0-to-1.5-meter lateral gap).

Upon determination of likely-inconvenience, the vehicle may take different options. For instance, the planning system or other module may adjust the wait time (e.g., from 5 minutes to 1 minute) and notify the rider or other user about the change in wait time. This may be done when the determination has changed from unlikely-inconvenient to likely-inconvenient, or when the likely-inconvenient determination does not exceed some threshold value (e.g., below a 75% threshold, or no more than a 3.5 on a scale of 0.0 to 5.0, or more or less). When the likely-inconvenient determination exceeds some threshold value (e.g., a 75% or higher threshold, or a 4.0 on a scale of 0.0 to 5.0, or more or less), the system may "fail" the stop, causing the vehicle to leave the pick-up or drop-off location and notify the rider or other user as to the change in status. Alternatively or additionally, the system may evaluate other stopping locations that may be farther or around the corner from the initially selected stopping location. Should one of those other locations satisfy the likely-inconvenient criteria and any other factors (e.g., equivalent walking time for a rider to get to the vehicle), then information about the updated pickup location can be communicated to the rider. Thus, the system may perform at least one of: (i) sending a notification to a client device of the rider (or other customer) regarding a change to a pick-up or drop-off location to meet the vehicle, (ii) adjusting the stopping location, (iii) causing modification to a driving operation of the vehicle in the autonomous driving mode to handle the change in the location, and/or (iv) transmitting information about the location change to a remote management system.

The evaluations at blocks 1004 and 1008 of FIG. 10 may be performed in different ways by the vehicle's onboard computing system (or optionally partly or fully by a remote support system). In many instances it may be challenging to rely only on heuristics to obtain an accurate characterization of inconvenience. In other instances, the system may employ learned inconvenience using a robust and curated labeled dataset. In one example, the system may use a set of simple heuristics to bisect the pullovers into likely-inconvenient and unlikely-inconvenient categories. In one approach, the system can employ a machine learning detection algorithm to characterize inconvenience in different situations to be not obstructing, unlikely-obstructing or likely-obstructing.

Whether using a heuristic-based approach or a machine learning-based approach, the system may split the obstruction evaluation process into a detection stage (e.g., how obstructive/inconveniencing is the vehicle to other road users?) and a reaction stage (what to do in such an obstructive/inconveniencing situation?). For heuristic-based detection, simple heuristics are used to identify those scenarios that the vehicle is likely to be obstructing/inconveniencing. In this approach, for the reaction stage, while the vehicle may trigger behavior changes by itself, the vehicle may also send remote assistance requests for verification, which would enable the remote assistance service to trigger behavior changes (e.g., instruct the vehicle to move along to a different stopping location). Thus, in this approach, for likely-inconvenience (likely-obstructing) scenarios, the vehicle would make a change to the pick-up or drop-off process (e.g., by moving along to a different stopping location down the street or around the corner) immediately, while in the unlikely-inconvenience (unlikely-obstructing) scenarios, the vehicle may send a request for remote assistance. Hence, in this example, the system would not rely on remote assistant to move upon a likely-obstructing determination, but can ask remote assistance for a "sanity check" of its unlikely-obstructing determination. Here, any evaluation by the remote assistance service may be used to update the curated labeled dataset.

As noted above, signals evaluated in the inconvenience analysis include both static signals and dynamic signals. The static signals are used to evaluate the quality of the pulled-over (stopping) location itself and do not change over time. Examples of static signals include whether the vehicle is stopped in a driving lane or at least partly in a bike lane, the amount of lateral offset from the curb, the narrowness of the road, etc. Static signals, which may be associated with the roadway, parking or stopping regulations, or the vehicle itself, are not associated with other road users. In contrast, dynamic signals involve the behavior of other road users and as such will change over time. Accurate modeling of dynamic signals may be more challenging than modeling the static signals.

According to one aspect, for static signals, the pulled-over location may be obstructing if any of the following is true, First, the vehicle is (or will) stop in a lane, have a small right offset or have a large offset, where the offset is how close the vehicle is to the curb/road edge.

Second, if the vehicle is on a narrow road or otherwise does not have adequate space for other road users to get around the vehicle. Third, when the vehicle is on a high density road for an extended stop in lane (e.g., 1-3 minutes or no less than 30 seconds, or more or less). Or fourth, the vehicle has pulled over in front of a feature or object for which stopping can be problematic. This could include a residential driveway (unless, for instance, the rider being picked up is associated with that residence), a crosswalk, a wheelchair ramp, a keep clear zone, a fire hydrant, a no stopping or no standing zone, etc., In some situations, such features or objects may not be part of the available map data (e.g., roadgraph information), or there may be temporal or environmental restrictions (e.g., no parking on Thursdays for street cleaning, a limit of up to 5 or 10 minutes to park, or no parking when the road is snow covered). In these situations, the system may need to modify an initially selected stopping location once the vehicle is on site and receives real-time sensor information from its perception system.

For dynamic signals, the system may employ a proxy to measure the degree of inconvenience to other road users and also decide the threshold to identity as likely-inconvenience (likely-obstructing) scenarios. By way of example, the system may use a behavior planning progress cost in spacetime according to road user estimations by the behavior modeling system. This could include considering the progress cost in the future 5 or 10 seconds for each road user of a set of nearby road users. Here, the system may filter out certain road users from its analysis if it is determined that they would not be impacted by the vehicle stopping. The progress cost for each road user may be updated regularly, e.g., once per second to up to 10 times per second (or more or less). The progress cost can be accumulated, because the duration the vehicle stays pulled over may play a role in the inconvenience road users would experience. For example, if the vehicle pulled over for 2 minutes and the system obtains a progress cost each minute, those two values can be summed to define the inconvenience, or a min/max evaluation can be performed. Alternatively, more recent progress costs may be weighted more heavily than older progress cost values, because the present status may be more relevant to inconvenience.

Dynamic signals can include traffic monitoring. For instance, the system may keep track of the traffic observations along each lane segment in the past X amount of time (e.g., the last 10-30 seconds, within the last 3 minutes, etc.). Those observations can include the average vehicle speed, the latest speed vehicle, the observation counts, etc. For this, the system may employ a heuristic that calculates whether any agents/road users have ever been near the vehicle by obtaining the identifiers of selected lane segments that are around the vehicle's pulled-over location, and fetching the value of an observation count field for those selected lane segments at every iteration. Here, if the value becomes nonzero in any of the selected lane segments, the system would identify that there are one or more road users near the vehicle.

If no other road user is anywhere near the vehicle, the system may have a high degree of certainty (e.g., at least 90% certain) that the vehicle is not currently inconveniencing any road users; hence, the system can classify the scenario as unlikely-inconvenience (unlikely-obstructing). This approach can help improve the accuracy of classifying different scenarios on top of a first-pass classification based only on static signals.

According to one aspect, the system may validate the dynamic signals against a curated test set of highly traffic obstructing pullovers to ensure that likely-obstructing and unlikely-obstructing decisions are made accurately (e.g., a "correct" decision is made at least 95+% of the time). Examples of such highly traffic obstructing pullovers may include any of the ones described above for FIGS. 5-9. End-to-end evaluation can be performed to identify the precision of the system's inconvenience detection, e.g., by comparing a rate of confirmations from remote assistance for the vehicle to move along when the vehicle determines it is likely to be obstructing. The rate of confirmations from remote assistance for the vehicle to move along can also be compared to any requests sent by the vehicle when it determines that it is not likely to be obstructing, in order to identify a false negative rate.

Double Parking Situations

As noted above, double parking situations may cause inconvenience to other road users, including vehicles parked in parking spots or otherwise pulled over alongside the curb or road edge.

Double parking is an ongoing challenge for pick-ups and drop-offs in many situations, particularly in dense urban environments due to limited parking spots and heavy traffic. Double parking can cause obstruction to other vehicles, preventing them from because another vehicle is blocking them. One way to look at the impact ("cost") of double parking is as a constant cost that is active in locations where the projection of objects overlap with the vehicle's pullover location. However, this approach may not be suitable to effectively position the vehicle longitudinally when taking (in) convenience into account for other parked vehicles. In this context, inconvenience here involves the ability of an average driver to pull out from a spot when another vehicle is double parked. Modifying the double parking logic of a vehicle operating in an autonomous driving mode to reduce inconvenience to other vehicles can improve overall pullover quality.

According to aspects of the technology, there may be three considerations to improve pullover quality with double parking. One is defining suitable metrics to evaluate double parking inconvenience to an already parked vehicle. A second is evaluating double parking where the already parked vehicles may be oriented relative to the curb at different angles: parallel (see, e.g., FIG. 8A), perpendicular, and angled (see, e.g., FIG. 8B) parked vehicles. For any parked vehicle orientation, the vehicle may seek to ensure that when double parking, it positions itself in such a way that minimizes the number of vehicles blocked. Third, in situations where double parking may be the best (or only) way to perform a pick-up or drop-off, consider how to prioritize parking to enable the parked vehicle to be able to pull out.

FIG. 11 illustrates a parallel parking situation 1100, in which vehicle 1102 can double park alongside one or more parked vehicles 1104$_a$, 1104$_b$, and 1104$_c$. In this example, the vehicle 1102 may position itself longitudinally as indicated by dashed arrow 1106 so that the vehicle 1102 has the least impact (inconvenience) on the parked vehicles 1104. For instance, if the vehicle 1104; pulls out from its spot based on the current position of the vehicle 1102, it would have an effective swept path shown in dashed area 1108. Note that the width 1110 of the swept path is greater than the actual width 1112 of the vehicle 1104$_b$, because it is leaving the spot at an angle. The shape of the swept path 1108 may vary not only due to the size/shape of the vehicle 1104$_b$ and positioning of the vehicle 1102, but may also vary due to the location of vehicle 1104$_a$ within its spot. For instance, the farther away vehicle 1104$_a$ is from vehicle 1104$_b$, the shallower the pullout angle vehicle 1104$_b$ may need to exit its spot.

In the example of FIG. 11, the system may determine that the number of vehicles being "blocked" is 1: namely, vehicle 1104$_c$ would be considered to be blocked. In this example, vehicle 1104$_b$ is considered to be blocked because it will have a maneuver path in front of vehicle 1102 (as shown by swept path 1108). Vehicle 1104$_c$ may be considered to be blocked because it is positioned at least partly behind vehicle 1102, and vehicle 1102 is in the lane that vehicle 1104$_c$ would need to pull into. Because there are 3 parked vehicles within a determined distance of vehicle 1102 (e.g., within 1 vehicle length), the percentage of vehicles blocked is 33.3%. Note that in a situation where vehicle 1104$e$ may be able to perform a double lane change (e.g., because a motorcycle could maneuver to pull around vehicle 1102), in that case the system may consider no vehicle as being blocked, and the percentage of vehicles blocked would be 0%.

Figure 12A:
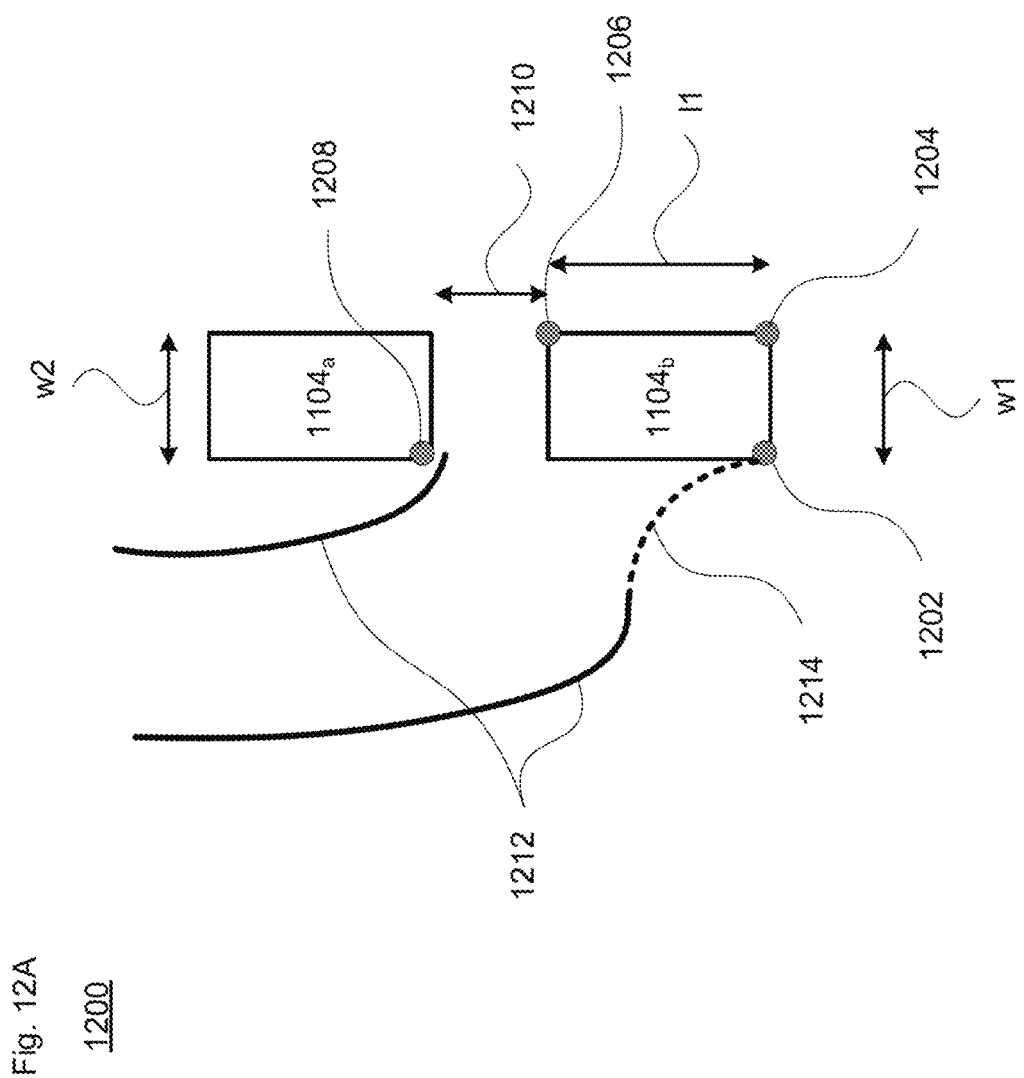
FIGS. 12A-B illustrate a trajectory evaluation for a parked vehicle in accordance with aspects of the technology.
Figure 12B:
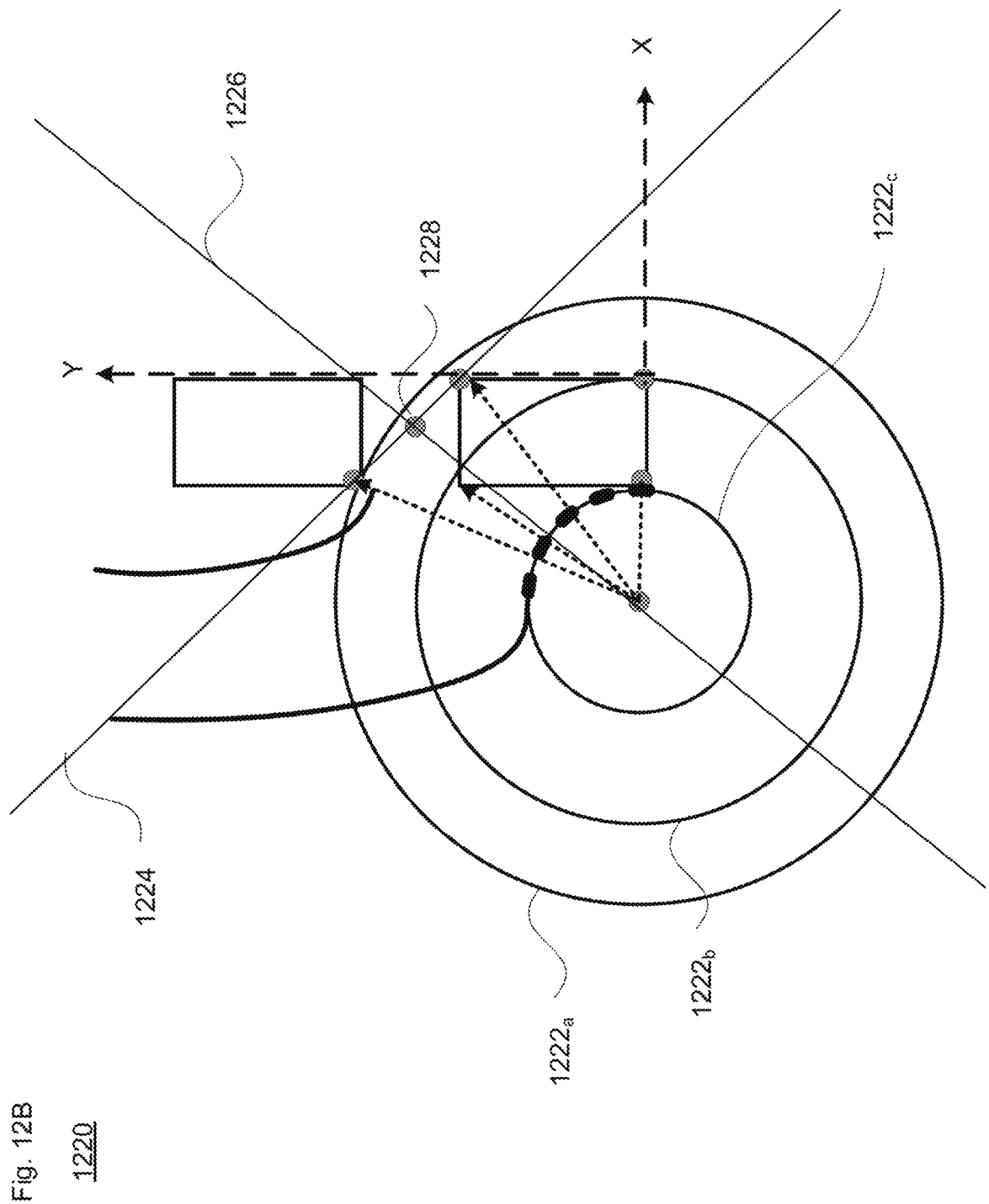

FIGS. 12A-B illustrate trajectory considerations when a vehicle, such as vehicle 1104$_b$, pulls out of a spot when there is another vehicle such as vehicle 1104$_a$ ahead of it. As shown in view 1200 of FIG. 12A, vehicles 1104$_a$ and 1104$_b$ are represented by rectangular bounding boxes. The overall length of the vehicle is employed in the bounding box because absent a vehicle model for a particular parked vehicle, it can be difficult to determine that vehicle's wheelbase. Vehicle 1104$_b$ has a marker 1202 adjacent to the left rear corner or left rear wheel, a marker 1204 adjacent to the right rear corner or right rear wheel, and a marker 1206 near the right front corner or right front wheel. Vehicle 1104$_a$ has a marker 1208 adjacent to its left rear corner or left rear wheel. The width and length of vehicle 1104$_b$ are indicated by w1 and 11, respectively, and the width of vehicle 1104$_a$ is indicated by w2. 1210 indicates a "safe gap" (sg) or spacing between the two vehicles, and lines 1212 illustrate a projected swept path of vehicle 1104$_b$ when pulling out of its parked location. Here, dotted curved segment 1214 of the outermost line 1212 indicates where the double-parked vehicle should not encroach.

View 1220 of FIG. 12B illustrates a trajectory evaluation for vehicle 1104$_b$ as it pulls out of its spot. Here, assume that the right rear corner (marker 1204) is the (0,0) location along an X-Y plane. Given this, marker 1202 is at (−w1,0), marker 1206 is at (0,11) and marker 1208 is at (−w2, 11+sg). As shown in view 1220, there are 3 concentric circles 1222$_a$, 1222$_b$, and 1222$_c$, centered at (−b*sg/w2, 0). Here, b=l1+ sg/2+ (w2$^2$)/(2 sg). Innermost circle 1222$_c$ intersects marker 1202, middle circle 1222$_b$ intersects marker 1204, and outermost circle 1222$_a$ intersects marker 1206. From this, lines 1224 and 1226 are determined. Line 1224 has a slope of:

Y=(−sg/w2) x+I1, while line 1226 has a slope of Y=(w2/sg) x+b). In this example, b is the y-intercept of line 1226, and lines 1224 and 1226 are perpendicular (therefore the product of their slope is −1). The point 1228 at which lines 1224 and 1226 intersect is the midpoint of the line from the rear left (marker 1208) of the first (front) vehicle $1104_a$ to the front right (marker 1210) of the second (rear) vehicle $1104_b$.

It may be reasonably assumed that the double-parked vehicle $1104_b$ will utilize its front and back gap to adjust its trajectory to reach the safe gap between two vehicles. In one example, this safe gap is a constant determined according to average human driving ability and an average steering wheel angle, at 0.5*vehicle length. Simulation results have shown that with safe gap at 0.5*l1 (vehicle length), a parked vehicle can pull out successfully 95% of the time.

Double parking inconvenience can be evaluated as a cost function during pullover selection for the vehicle operating in an autonomous driving mode. Here, one can assume that the probability of a double lane change for pullover is very small, therefore one can prioritize blocking a parked vehicle that, if it pulls out, would need to change lanes twice to get around the double-parked vehicle. According to this aspect of the technology, the cost will be based on the number of vehicles blocked by the double-parked vehicle over the total number vehicles within the consideration range:

$$\text{Cost} = \text{weight} * \sum_{i=1}^{n} \text{sign}(-d_i)/n$$

Where the weight is a constant that can be determined by experimentation for other pullover costs, and di is the distance from the front right corner of the double-parked vehicle to the $i^{th}$ parked vehicle that may try to pull out.

Figure 13:
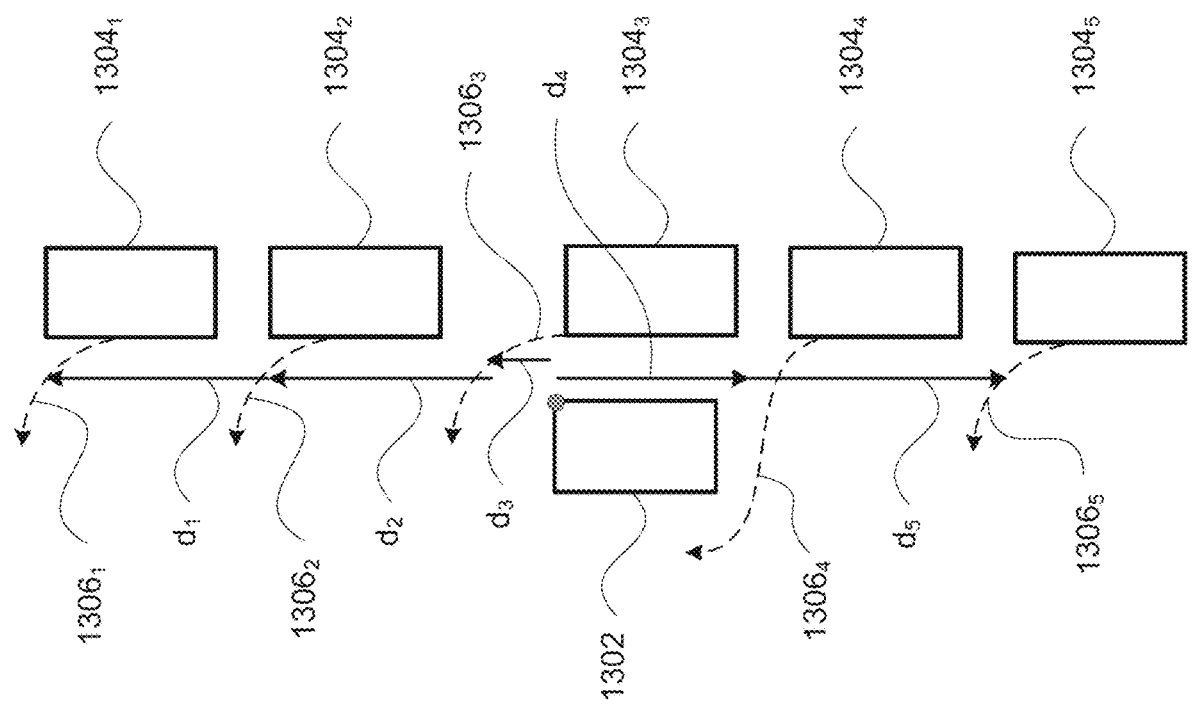
FIG. 13 illustrate a double-parking evaluation in accordance with aspects of the technology.

An example 1300 is shown in FIG. 13, illustrating a double-parked vehicle 1302 and 5 parked vehicles represented by bounding boxes $1304_1, \ldots, 1304_5$. In this example, it is assumed that the parked vehicles 1304 can adjust forward and/or backward to achieve the safe gap (sg). Dotted arrows $1306_1 \ldots 1306_5$ illustrate a possible pullout path or trajectory for each respective parked vehicle. Note that the arrows for $d_1$, $d_2$ and $d_3$ are positive and thus shown in the upward direction, while the arrows for $d_4$ and $d_5$ are negative and thus shown in the downward direction.

A preferred solution would be to position the double-parked vehicle 1302 between the pullout paths of a pair of adjacent parked vehicles. This would enable the vehicle in the back (e.g., parked vehicle $1304_4$ in this example) to double change lanes to be able to pull out, since vehicle 1302 is blocking the lane next to it. The vehicle in the front (e.g., parked vehicle $1304_3$ in this example) would be able to pull out in front of the vehicle 1302.

One goal in this type of double-parking situation is to "block" the minimum number of vehicles, in other words to limit inconvenience to a minimum number of parked vehicles. FIG. 14A illustrates an example 1400, in which there are a few possible pullover locations $1402_1$, $1402_2$, and $1402_3$ for the autonomous vehicle to double park in relation to a set of parked vehicles $1404_a$-$1404_d$. Here, instead of treating all possible pullover locations 1402 as being equal, by factoring in inconvenience to each parked vehicle the system may decide, based on the logic described above, to use location $1402_2$. This would allow vehicle $1404_c$ to pull out along trajectory 1406, and allow vehicle $1404_d$ to pull out (using a double lane change maneuver) along trajectory 1408.

Figure 14B:
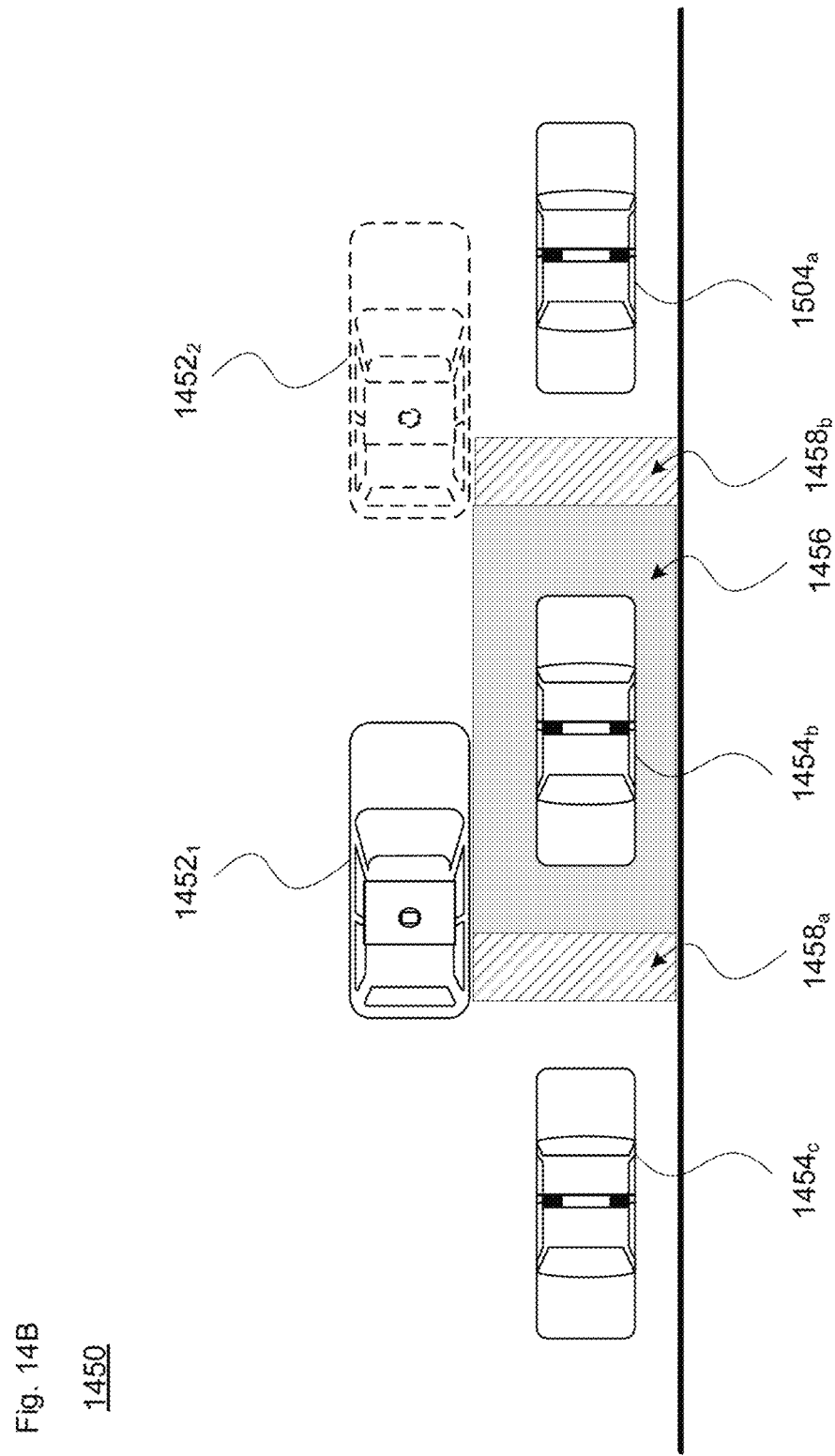

FIG. 14B illustrates another example 1450, in which one factor a double-parking vehicle can include in the inconvenience analysis is the size of the gaps between adjacent parked vehicles. This approach may not take into consideration the likely pullout trajectory for each parked vehicle. In this example, two possible positions $1452_1$ and $1452_2$ for the double-parking vehicle are shown. Here, there are three parked vehicles $1454_a$-$1454_c$. Shaded area 1456 shows a minimum pulling out region required for the blocked vehicle $1454_b$ to exit without difficulty. Regions $1458_a$ and $1458_b$ on either side of shaded area 1456 indicate that the parked vehicle could possibly pull out from the front or back of the space, depending on whether the double-parked vehicle 1452 overlaps (more) with the parked vehicle $1454_b$'s back or front.

In this scenario, for each double-parked vehicle, the following assumptions can be made. First, there exists a threshold for the pulling out boxes (1456) that enables the parked vehicle (1454) to pull out with no to minimal difficulty. And second, the probability of pulling out successfully should increase when the system minimizes the overlapping region of the vehicle 1452 and the blocked vehicle 1454's pulling out region.

Example System Architecture

Autonomous vehicles configured for passenger or cargo pick-up and drop-off may be part of a fleet of vehicles, whether those are sedans, minivans or other passenger vehicles, or box trucks, class 8 trucks or other types of cargo vehicles (or any combination thereof). As noted above, the vehicle may communicate with a back-end system that provides remote assistance, such as to aid in determining whether a stopping location is suitable for a pick-up or drop-off, or whether the vehicle should move along and select a different stopping location.

Figure 15A:
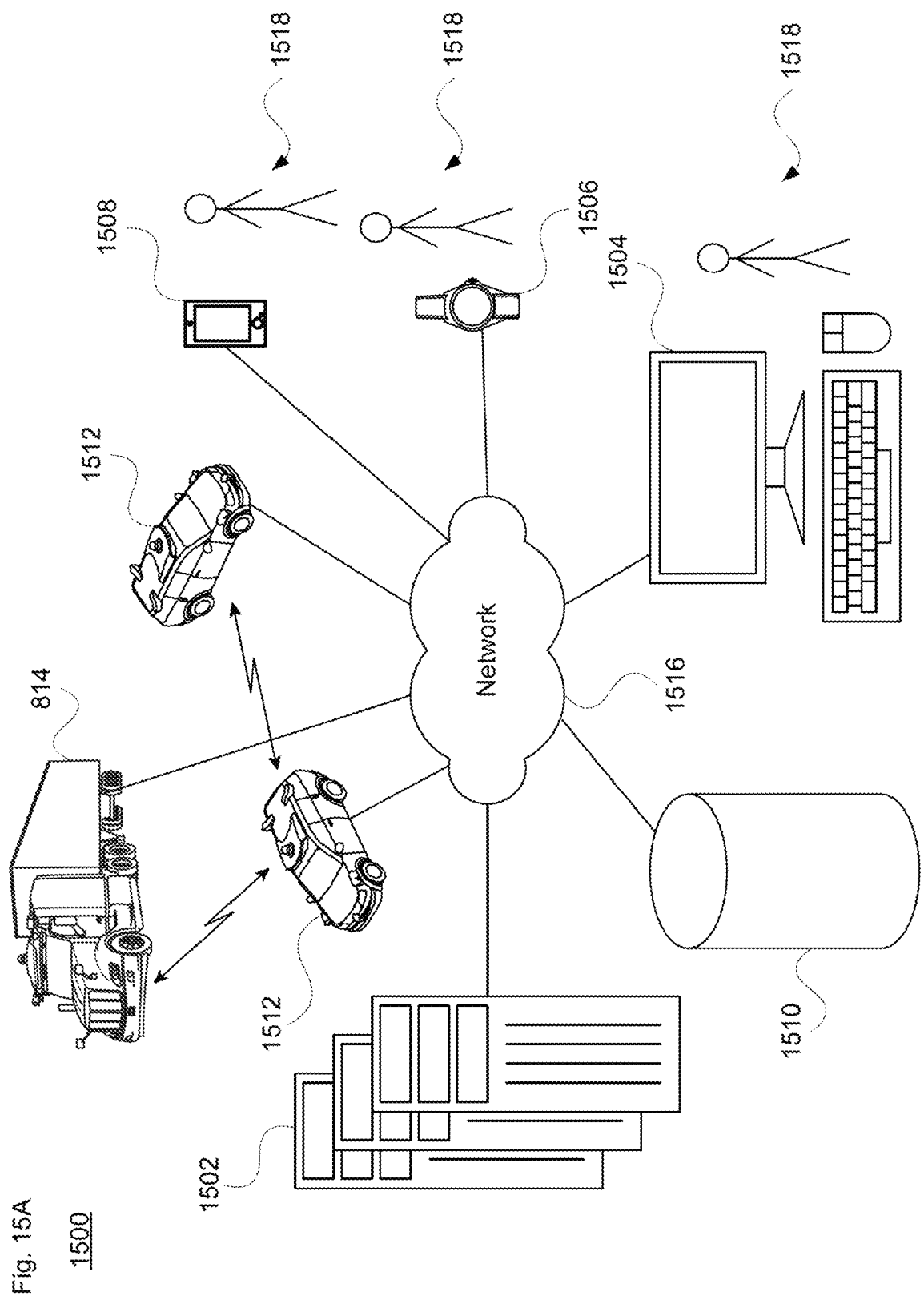
FIGS. 15A-B illustrate an example system in accordance with aspects of the technology.
Figure 15B:
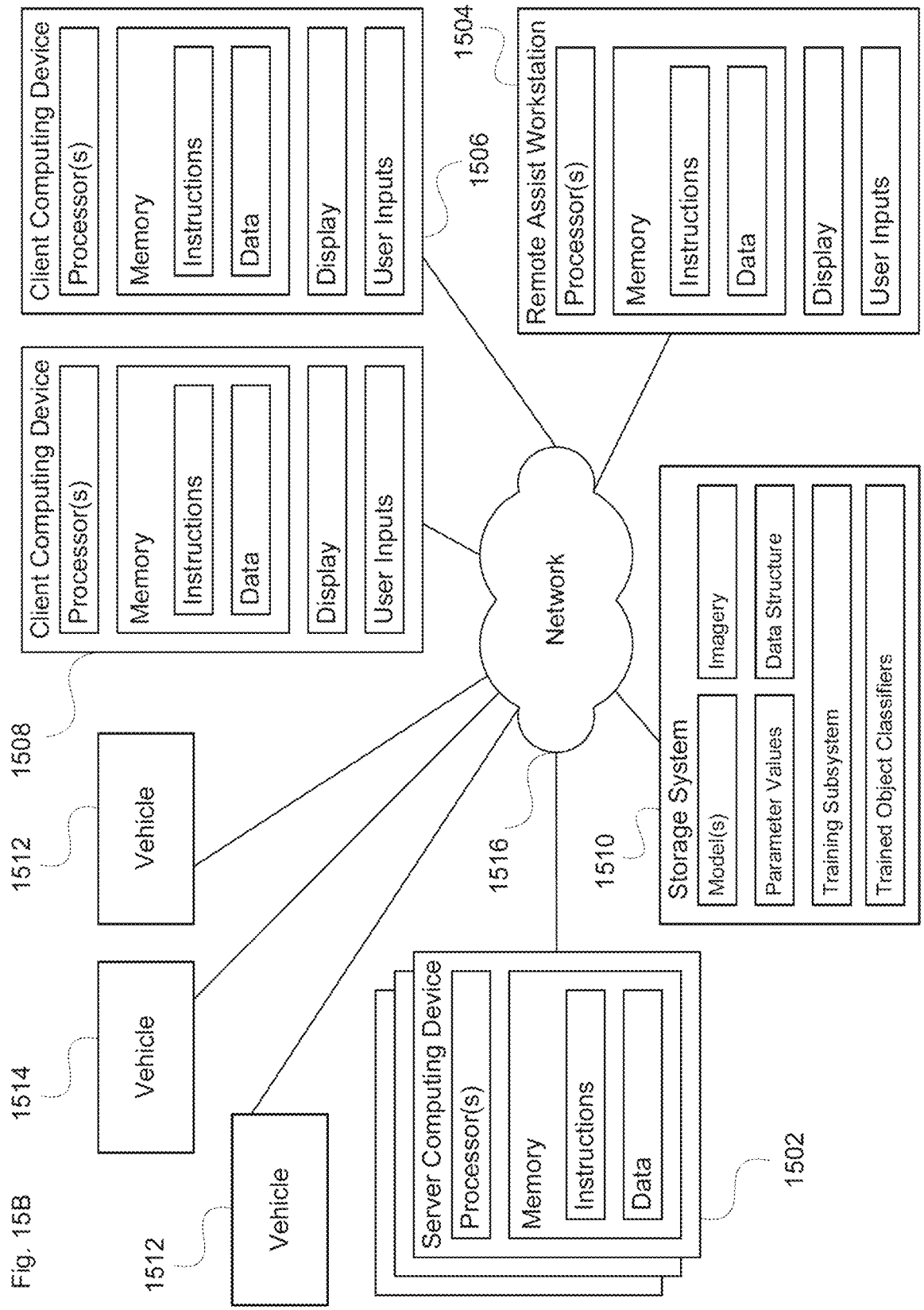

One example of a back-end system for fleet-type operation is shown in FIGS. 15A and 15B. In particular, FIGS. 15A and 15B are pictorial and functional diagrams, respectively, of an example system 1500 that includes a plurality of computing devices 1502, 1504, 1506, 1508 and a storage system 1510 connected via a network 1516. System 1500 also includes vehicles 1512 and 1514 configured to operate in an autonomous driving mode, which may be configured the same as or similarly to vehicles 100, 120, 140 and/or 160 of FIGS. 1A-E. Vehicles 1512 and/or vehicles 1514 may be parts of one or more fleets of vehicles that provide rides for passengers or deliver meals, groceries, cargo or other packages to customers. Although only a few vehicles and computing devices are depicted for simplicity, a typical system may include significantly more, such as tens or hundreds of vehicles.

As shown in FIG. 15B, each of computing devices 1502, 1504, 1506 and 1508 may include one or more processors, memory, data and instructions. Such processors, memories, data and instructions may be configured similarly to the ones described above with regard to FIG. 2 or 3A.

The various computing devices and vehicles may communicate directly or indirectly via one or more networks, such as network 1516. The network 1516 and any intervening nodes may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1502 may include one or more server computing devices having a plurality of computing devices, e.g., a load balanced server farm, that exchange information with different nodes of a network for the purpose of receiving, processing and transmitting the data to and from other computing devices. For instance, computing device 1502 may include one or more server computing devices that are capable of communicating with the computing devices of vehicles 1512 and/or 1514, as well as computing devices 1504, 1506 and 1508 via the network 1516. For example, vehicles 1512 and/or 1514 may be a part of a fleet of autonomous vehicles that can be dispatched by a server computing device to various locations. In this regard, the computing device 1502 may function as a dispatching server computing system which can be used to dispatch vehicles to different locations in order to pick up and drop off passengers or to pick up and deliver cargo or other items. In addition, server computing device 1502 may use network 1516 to transmit and present information to a user of one of the other computing devices or a rider in a vehicle. In this regard, computing devices 1504, 1506 and 1508 may be considered client computing devices (e.g., mobile phones, tablets or wearable computers such as smart watches or smart glasses).

As shown in FIGS. 15A-B each client computing device 1504, 1506 and 1508 may be a personal computing device intended for use by a respective user 818, and have all of the components normally used in connection with a personal computing device including a one or more processors (e.g., a central processing unit (CPU), graphics processing unit (GPU) and/or tensor processing unit (TPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 1506 and 1508 may be mobile phones or devices such as a wireless-enabled PDA, a tablet PC, a wearable computing device (e.g., a smart watch or smart glasses), or a netbook that is capable of obtaining information via the Internet or other networks.

In some examples, client computing device 1504 may be a remote assistance workstation used by an administrator or operator to communicate with riders of dispatched vehicles, to aid an autonomous vehicle with double-parking or other inconvenience decisions relating to stopping situations, etc. Although only a single remote assistance workstation 1504 is shown in FIGS. 15A-B, any number of such workstations may be included in a given system. Moreover, although the operations workstation is depicted as a desktop-type computer, operations workstations may include various types of personal computing devices such as laptops, netbooks, tablet computers, etc. By way of example, the remote assistance workstation may be used by a technician or other user to help process sign-related, including labeling of different types of signs.

Storage system 1510 can be of any type of computerized storage capable of storing information accessible by the server computing devices 1502, such as a hard-drive, memory card, ROM, RAM, DVD, CD-ROM, flash drive and/or tape drive. In addition, storage system 1510 may include a distributed storage system where data is stored on a plurality of different storage devices which may be physically located at the same or different geographic locations. Storage system 1510 may be connected to the computing devices via the network 1516 as shown in FIGS. 15A-B, and/or may be directly connected to or incorporated into any of the computing devices.

Storage system 1510 may store various types of information. For instance, the storage system 1510 may store autonomous vehicle control software which is to be used by vehicles, such as vehicles 1512 or 1514, to operate such vehicles in an autonomous driving mode. Storage system 1510 may also store heuristics or one or more models (e.g., machine learning models used for road user inconvenience evaluation) and data for training the models such as imagery, parameter values for the model, a data structure of different training information such as geolocation data, etc. The storage system 1510 may also store a training subsystem to train the model(s), as well as resultant information such as trained classifiers. The trained object classifiers may be shared with specific vehicles or across the fleet as needed. They may be updated in real time, periodically, or off-line as additional training input data is obtained. The storage system 1510 can also include route information, weather information, etc. This information may be shared with the vehicles 1512 and 1514, for instance to help with operating the vehicles in an autonomous driving mode.

Figure 16A:
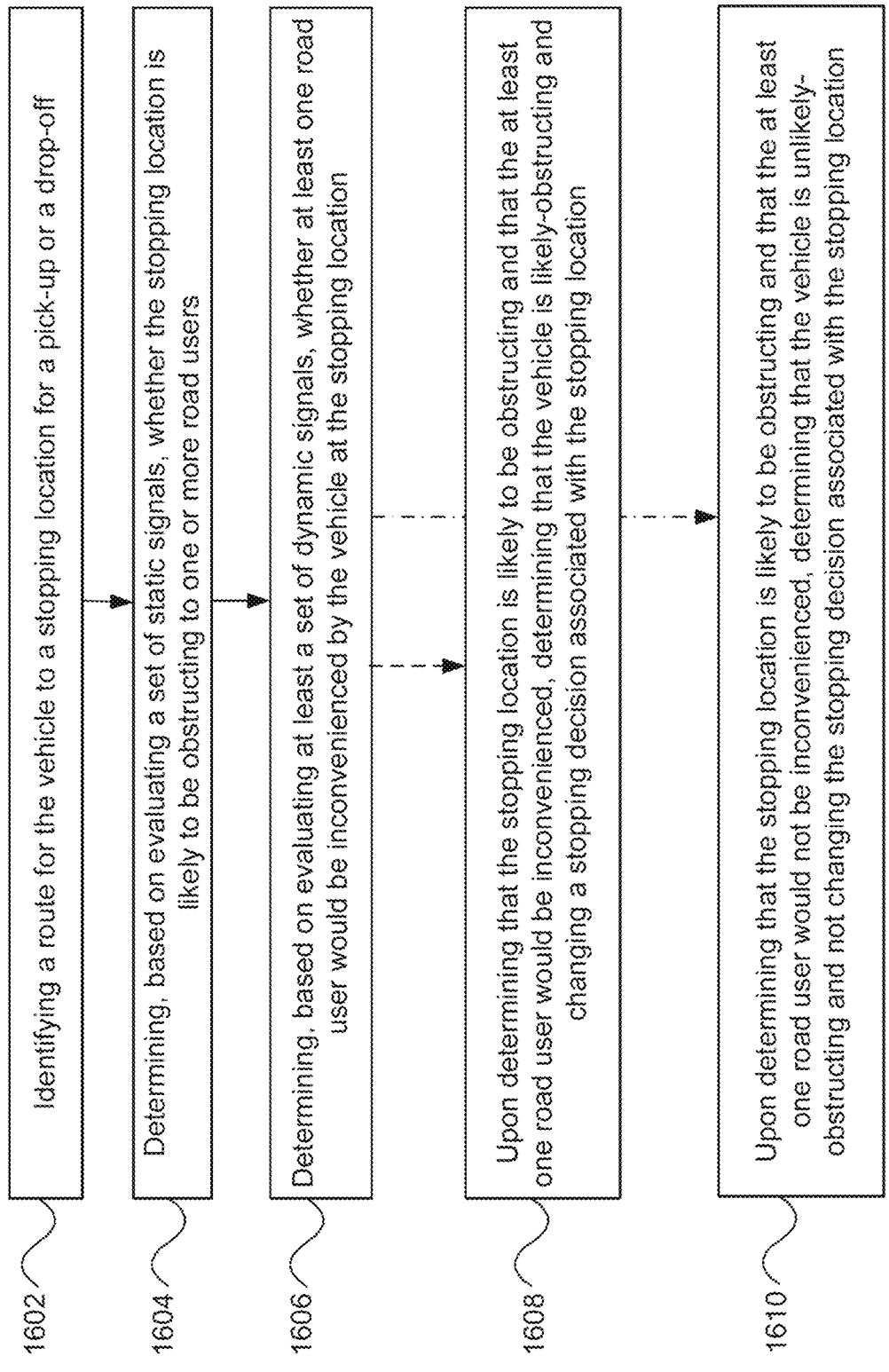
FIGS. 16A-B illustrate example methods in accordance with aspects of the technology.

FIG. 16A illustrates an example flow diagram 1600 for operating a vehicle in an autonomous driving mode. At block 1602, the process includes identifying a route for the vehicle to a stopping location for a pick-up or a drop-off. At block 1604, the process includes determining, based on evaluating a set of static signals, whether the stopping location is likely to be obstructing to one or more road users. At block 1606, the process includes determining, based on evaluating at least a set of dynamic signals, whether at least one road user would be inconvenienced by the vehicle at the stopping location. At block 1608, as shown by the dashed arrow, upon determining that the stopping location is likely to be obstructing and that the at least one road user would be inconvenienced, the process includes determining that the vehicle is likely-obstructing and changing a stopping decision associated with the stopping location. In contrast, at block 1610 as shown by the dash-dot arrow, upon determining that the stopping location is likely to be obstructing and that the at least one road user would not be inconvenienced, the process includes determining that the vehicle is unlikely-obstructing and not changing the stopping decision associated with the stopping location.

Figure 16B:
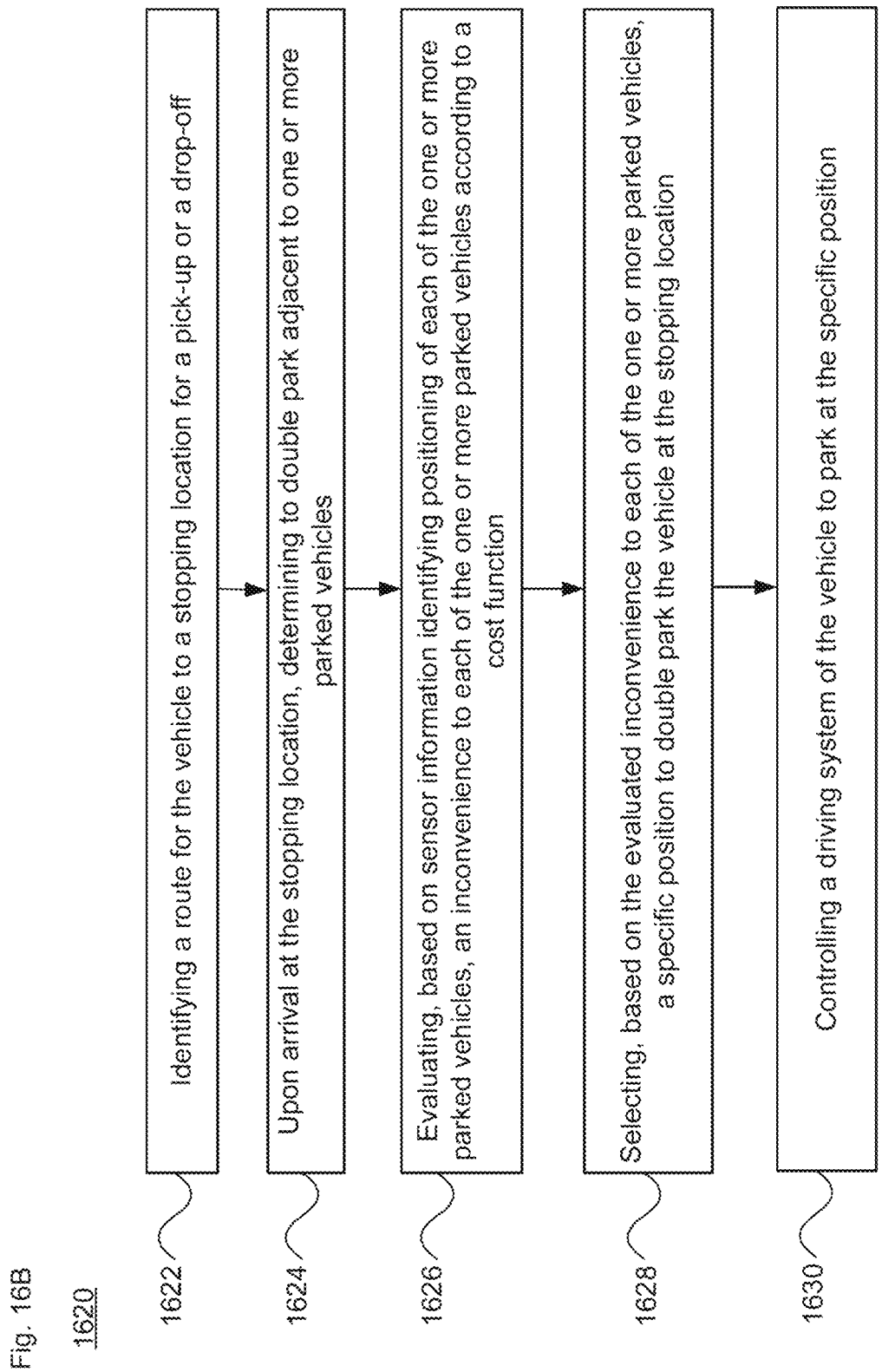

FIG. 16B illustrates an example flow diagram 1620 for operating a vehicle in an autonomous driving mode. The method comprises, at block 1622, identifying a route for the vehicle to a stopping location for a pick-up or a drop-off. At block 1624, upon arrival at the stopping location, the method includes determining to double park adjacent to one or more parked vehicles. At block 1626, the method includes evaluating, by one or more processors based on sensor information identifying positioning of each of the one or more parked vehicles, an inconvenience to each of the one or more parked vehicles according to a cost function. At block 1628, the method includes selecting, by the one or more processors based on the evaluated inconvenience to each of the one or more parked vehicles, a specific position to double park the vehicle at the stopping location. And at block 1630 the method includes controlling a driving system of the vehicle to park at the specific position in the autonomous driving mode.

While certain use cases described above focus on rider pick-up or drop-off situations in the ride hailing context, the technology may be used in many other situations. This can include delivery situations, where the person going to the vehicle may be a restaurant or store employee loading the vehicle with a meal, groceries, prescription or other package. Or the person may be the customer who is retrieving the package from the vehicle. Similarly, in a trucking scenario, the person or people heading to the vehicle could be warehouse workers that will load or unload the truck with cargo, or that need to transfer cargo to or from the truck (e.g., a mail delivery truck).

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method for operating a vehicle in an autonomous driving mode, the method comprising:
controlling, by one or more processors of the vehicle, a driving system of the vehicle to maneuver the vehicle to a stopping location for a pick-up or a drop-off;
upon the vehicle arriving at the stopping location, determining, by the one or more processors, to double park the vehicle adjacent to one or more parked vehicles;
evaluating, by the one or more processors based on sensor information identifying a position of each of the one or more parked vehicles, an inconvenience to a human driver that double parking by the vehicle would cause according to a cost function, wherein the evaluating is based at least in part on how the double parking by the vehicle would affect an ability of each of the one or more parked vehicles to pull out from each respective identified position;
selecting, by the one or more processors based on the evaluating, a specific position to double park the vehicle at the stopping location; and
controlling, by the one or more processors, the driving system of the vehicle to double park the vehicle at the specific position.

2. The method of claim 1, wherein the evaluating further includes determining an orientation of each parked vehicle.

3. The method of claim 1, wherein the evaluating further includes determining a minimum number of vehicles to block by the double parking.

4. The method of claim 1, wherein the evaluating further includes evaluating whether a given parked vehicle would be able to perform a double lane change maneuver.

5. The method of claim 1, wherein the evaluating further includes evaluating a safe gap between two adjacent parked vehicles.

6. The method of claim 1, wherein the evaluating further includes performing a trajectory evaluation for a given parked vehicle.

7. The method of claim 1, wherein the evaluating further includes evaluating a percentage of parked vehicles that would be blocked by the double parking.

8. The method of claim 1, wherein the cost function is based on a number of parked vehicles to be blocked by the double parking over a total number of parked vehicles within a selected consideration range.

9. The method of claim 1, wherein the cost function is determined according to the following equation:

$$\text{Cost} = \text{weight} * \sum_{i=1}^{n} \text{sign}(-d_i)/n$$

wherein the weight is a predetermined constant, n is a total number of parked vehicles, and $d_1$ is a distance from a front right corner of the vehicle to an $i^{th}$ parked vehicle that may try to pull out.

10. The method of claim 1, wherein the selecting the specific position to double park the vehicle at the stopping location is done so that the specific position is between pullout paths of a pair of adjacent parked vehicles.

11. The method of claim 1, wherein the selecting the specific position to double park the vehicle at the stopping location includes evaluating a minimum pulling out region required for each parked vehicle.

12. A vehicle configured to operate in an autonomous driving mode, the vehicle comprising:
a perception system including one or more sensors, the one or more sensors being configured to receive sensor data associated with objects in an external environment of the vehicle;
a driving system including a steering subsystem, an acceleration subsystem and a deceleration subsystem to control driving of the vehicle;
a positioning system configured to determine a current position of the vehicle; and
a control system including one or more processors, the control system operatively coupled to the driving system, the perception system and the positioning system, the control system being configured to:
control the driving system of the vehicle to maneuver the vehicle to a stopping location for a pick-up or a drop-off;
upon the vehicle arriving at the stopping location, determine to double park the vehicle adjacent to one or more parked vehicles;
evaluate, based on sensor information identifying a position of each of the one or more parked vehicles, an inconvenience to a human driver that double parking by the vehicle would cause according to a cost function, wherein the evaluation is based at least in part on how the double parking by the vehicle would affect an ability of each of the one or more parked vehicles to pull out from each respective identified position;
select, based on the evaluation, a specific position to double park the vehicle at the stopping location; and
control the driving system of the vehicle to double park the vehicle at the specific position.

13. The vehicle of claim 12, wherein the evaluation further includes a determination of an orientation of each parked vehicle.

14. The vehicle of claim 12, wherein the evaluation further includes a determination of a minimum number of vehicles to block by the double parking.

15. The vehicle of claim 12, wherein the evaluation further includes an evaluation of whether a given parked vehicle would be able to perform a double lane change maneuver.

16. The vehicle of claim 12, wherein the evaluation further includes an evaluation of a safe gap between two adjacent parked vehicles.

17. The vehicle of claim 12, wherein the evaluation further includes performance of a trajectory evaluation for a given parked vehicle.

18. The vehicle of claim 12, wherein the evaluation further includes an evaluation of a percentage of parked vehicles that would be blocked by the double parking.

19. The vehicle of claim 12, wherein the cost function is based on a number of parked vehicles to be blocked by the double parking over a total number of parked vehicles within a selected consideration range.

20. The vehicle of claim 12, wherein the selection of the specific position to double park the vehicle at the stopping location is either:
- done so that the specific position is between pullout paths of a pair of adjacent parked vehicles; or
- includes an evaluation of a minimum pulling out region required for each parked vehicle.

* * * * *